United States Patent
Kleb et al.

(10) Patent No.: US 6,547,271 B2
(45) Date of Patent: Apr. 15, 2003

(54) TRAILER COUPLING

(75) Inventors: Emmerich Kleb, Markgroeningen (DE); Michael Fischer, Asperg (DE); Hans Riehle, Ludwigsburg (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 1 day.

(21) Appl. No.: 09/826,390

(22) Filed: Apr. 4, 2001

(65) Prior Publication Data

US 2002/0020988 A1 Feb. 21, 2002

(30) Foreign Application Priority Data

Apr. 5, 2000 (DE) .......................... 100 17 013

(51) Int. Cl.$^7$ ................................. B60D 1/06
(52) U.S. Cl. .................... 280/491.3; 280/511
(58) Field of Search .................... 280/491.1, 491.3, 280/491.5, 511

(56) References Cited

U.S. PATENT DOCUMENTS

| | | | | |
|---|---|---|---|---|
| 4,078,827 A | * | 3/1978 | Pilhall | 280/491.3 |
| 4,923,205 A | * | 5/1990 | Durm | 280/491.3 |
| 6,000,709 A | | 12/1999 | Gentner et al. | |
| 6,402,178 B1 | * | 6/2002 | Ifflaender | 280/491.3 |
| 6,409,201 B1 | * | 6/2002 | Riehle | 280/491.1 |

FOREIGN PATENT DOCUMENTS

| | | | | |
|---|---|---|---|---|
| DE | 863001 | * | 1/1953 | 280/491.1 |
| DE | 7233868 | | 12/1972 | |
| DE | 7 233 868 | | 12/1972 | |
| DE | 33 28 524 | | 2/1985 | |
| DE | 34 42 514 | | 5/1986 | |
| DE | 3541904 | * | 6/1987 | 280/491.3 |
| DE | 196 05 570 | | 3/1997 | |
| DE | 196 54 867 | | 8/1997 | |
| DE | 196 12 961 | | 10/1997 | |
| DE | 198 58 978 | | 6/2000 | |
| DE | 198 59 961 | | 7/2000 | |
| EP | 0 288 366 | | 10/1988 | |
| EP | 0 850 147 | | 7/1998 | |
| EP | 1 024 036 | | 8/2000 | |
| GB | 1504643 | * | 3/1978 | 280/491.3 |
| WO | 91/15374 | | 10/1991 | |

* cited by examiner

Primary Examiner—Daniel G. DePumpo
(74) Attorney, Agent, or Firm—Barry R. Lipsitz; Douglas M. McAllister

(57) ABSTRACT

In order to improve a trailer coupling for motor vehicles comprising a pivot bearing body which is rigidly attached to the vehicle and upon which there is mounted a pivotal element that is pivotal about a pivotal axis, a ball neck which extends outwardly from the pivotal element and carries a coupling ball at the end thereof remote from the pivotal element, and a locking device for fixing the pivotal element relative to the pivot bearing body in interlocking manner, so that the locking device is constructed in as simple a manner as possible and can be implemented in simple manner so that it is free of play, it is proposed that the pivotal element is mounted on the pivot bearing body such that it is displaceable along the pivotal axis thereof and that by displacement of the pivotal element along the pivotal axis the pivotal element is moveable into a position wherein it is pivotal relative to the pivot bearing body and into a position wherein it is fixed relative to the pivot bearing body in mutually non-rotatable manner by means of interlocking arrangement.

40 Claims, 11 Drawing Sheets

Figure 1:
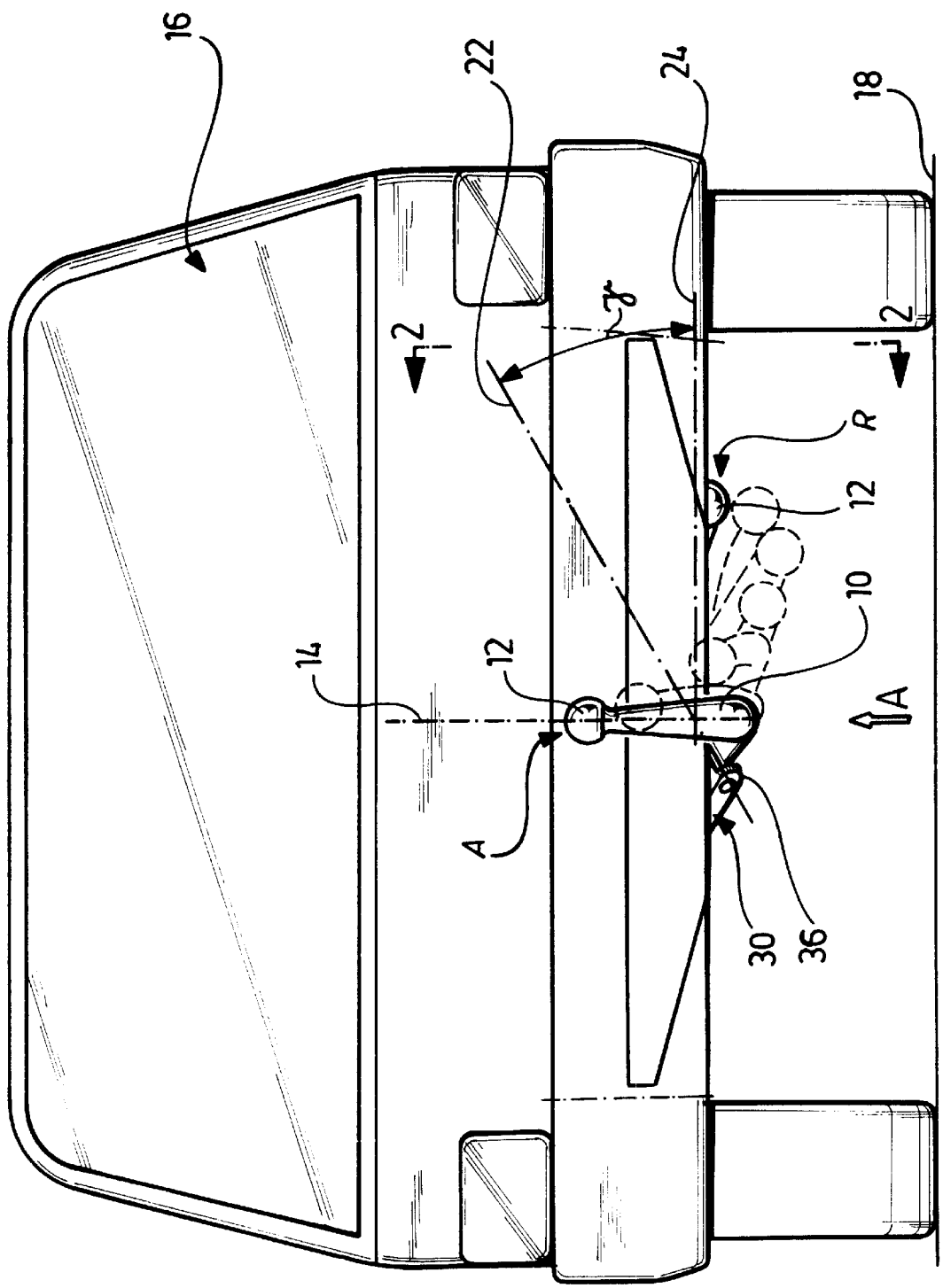

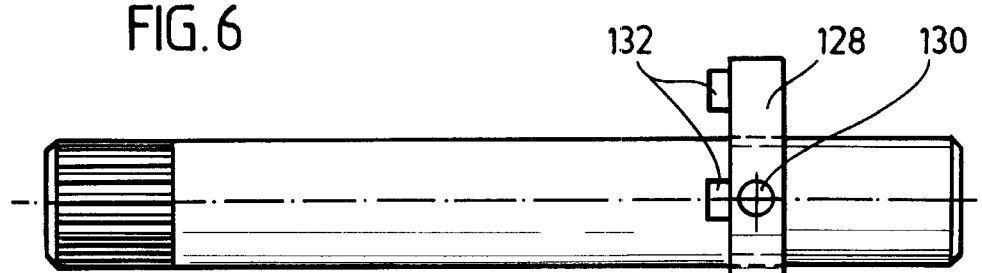
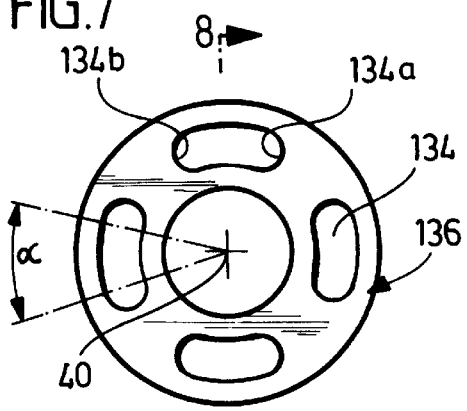
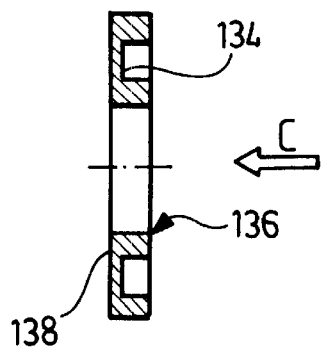
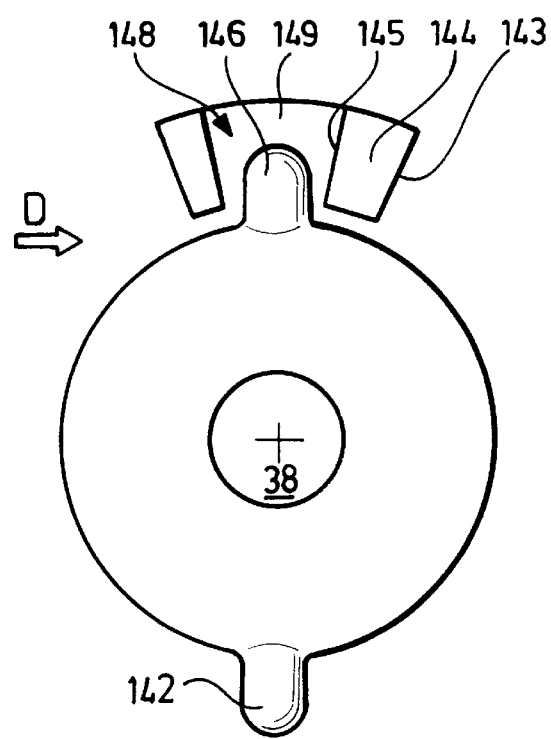
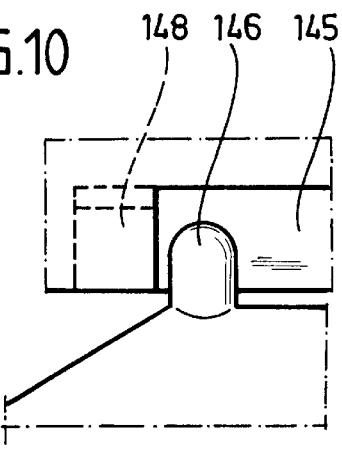

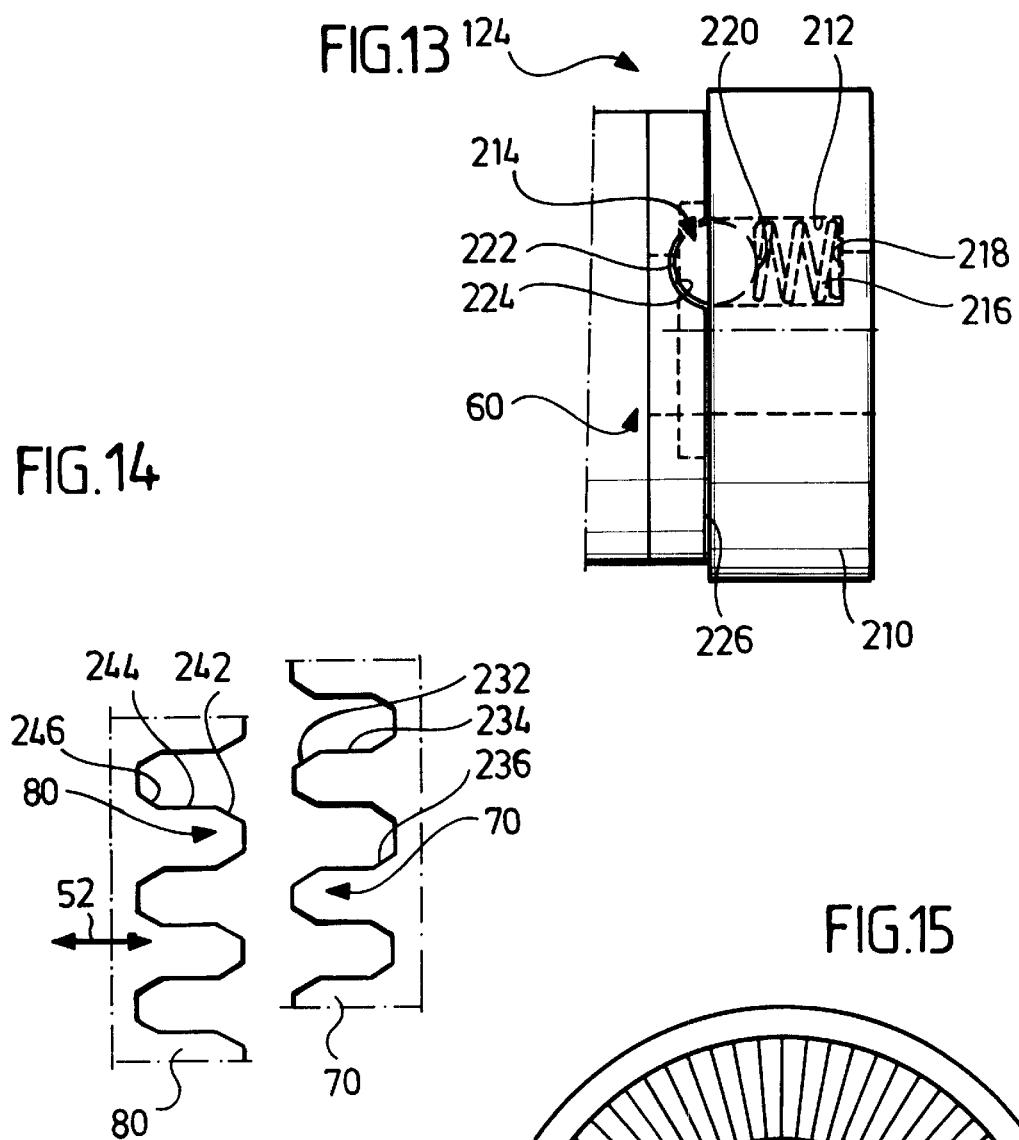
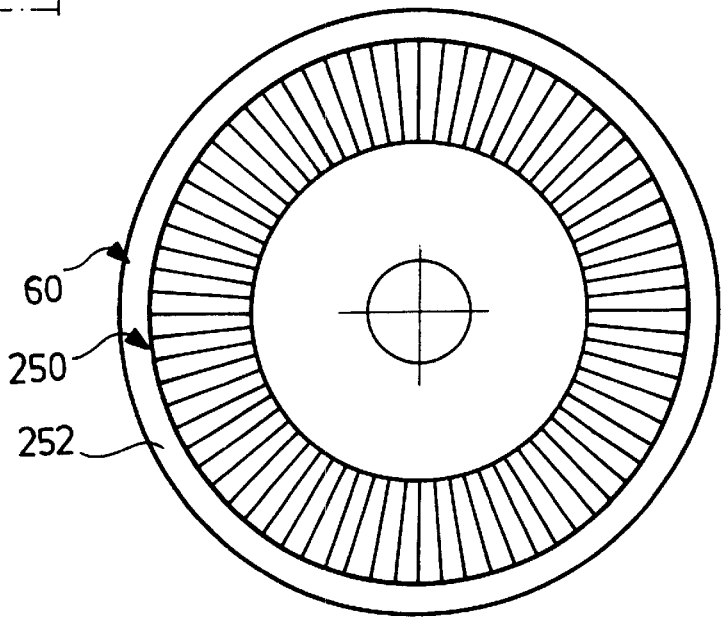

TRAILER COUPLING

The invention relates to a trailer coupling for motor vehicles comprising a pivot bearing body which is rigidly attached to the vehicle and upon which there is mounted a pivotal element that is pivotal about a pivotal axis, a ball neck which extends outwardly from the pivotal element and carries a coupling ball at the end thereof remote from the pivotal element, and a locking device for fixing the pivotal element relative to the pivot bearing body in interlocking manner.

Trailer couplings of this type are known from EP 0 799 732 for example.

In the case of trailer couplings of this type however, a locking device of complex construction is required, said device additionally presenting problems in regard to the degree of free play.

Consequently, the object of the invention is to improve a trailer coupling of the type outlined above in such a manner that the locking device will be of the simplest possible construction and can be implemented in simple manner such that it is free of play.

In accordance with the invention, this object is achieved in the case of a trailer coupling of the type described hereinabove in that the pivotal element is mounted on the pivot bearing body in such a way that it is displaceable along the pivotal axis thereof, and in that, by virtue of a displacement of the pivotal element along the pivotal axis, the pivotal element is moveable into a position wherein it is pivotal relative to the pivot bearing body and into a position wherein it is fixed relative to the pivot bearing body in mutually non-rotatable manner by means of an interlocking arrangement.

The advantage of the solution in accordance with the invention is thus to be seen in the fact that it is now feasible for the pivotal element, which has in any case to be mounted such that it is moveable relative to the pivot bearing body, to be bestowed with an additional movement along the pivotal axis so that, by virtue of this additional movement, it is transferable from a position in which it is rotationally fixed relative to the pivot bearing body into a position in which it is rotatable relative to the pivot bearing body and vice versa.

Thus, the kinematic movements required for the pivotal movement and the fixing of the pivotal element are now transferred to this pivotal element in a constructionally particularly advantageous manner.

This is also especially advantageous for reason that there are no large forces effective on the pivotal element during the pivotal movement itself, so that the pivot bearing itself does not necessarily have to be constructed in such a manner as to accommodate all of the forces effective on the ball neck when in the towing mode, but rather, the interlocking fixing arrangement for the pivotal element can be formed in such a manner that it will accommodate an appreciable proportion of the forces effective on the ball neck when this is in its operative position.

In regard to the production of the interlocking arrangement, no detailed comments were made in the context of the previous explanation of the solution in accordance with the invention. Thus, it is particularly advantageous if the pivotal element is connected to at least one interlocking element in mutually non-rotatable manner so that this interlocking element will move with the pivotal element.

In such an arrangement, this first interlocking element could still be movable in a linear manner along the pivotal axis relative to the pivotal element for example.

Hence, it is particularly expedient if the at least one first interlocking element is arranged such that it is stationary relative to the pivotal element so that it would then be immovable relative to the pivotal element in both the direction of rotation about the pivotal axis as well as along the pivotal axis.

Furthermore, it is expedient if the pivot bearing body is connected to at least a second interlocking element which is substantially non-rotatable relative to the pivotal axis and, by means of which in conjunction with the first interlocking element, a rotational fixing of the pivotal element relative to the pivot bearing body is attainable.

The at least one second interlocking element could thereby be moveable relative to the pivot bearing body along the pivotal axis for example.

In order to obtain an interlocking arrangement for fixing the pivotal element relative to the pivot bearing body which is as free from play as possible, provision is preferably made for the at least one second interlocking element to be fixed immovably relative to the pivot bearing body.

In regard to the effect of the first and second interlocking elements in the case of an arrangement for fixing the pivotal element relative to the pivot bearing body, no detailed comments were made in connection with the previous explanation of the individual embodiments.

Thus for example, it would be conceivable to provide yet at least one further interlocking element for fixing the pivotal element relative to the pivot bearing body in mutually non-rotatable manner, said further interlocking element cooperating with the first interlocking element and also with the second interlocking element.

However, on grounds of providing a solution that is as constructively simple as possible, it is particularly expedient if the first interlocking element or the second interlocking element is adapted to be moved into engagement with the respective other interlocking element.

In order to obtain an arrangement for fixing the pivotal element relative to the pivot bearing body which is as free from play as possible when in the mutually non-rotatable position, provision is preferably made for at least one of the interlocking elements to comprise interlocking surfaces which taper in the direction of engagement, said surfaces serving to fix the pivotal element relative to the pivot bearing body in mutually non-rotatable manner.

The effect produced by these tapering surfaces is that it is thereby possible to create a play-free fixing arrangement which prevents rotational movement about the pivotal axis by a process of co-operation with a further interlocking element that adjoins these tapering surfaces.

In principle, these surfaces that taper in the direction of engagement could be constructed in any arbitrary manner. Thus, it would be conceivable to let these surfaces that taper in the direction of engagement extend parabolically or hyperbolically towards one another.

However, a constructively particularly simple solution envisages that the surfaces that taper in the direction of engagement should extend conically towards one another.

Such surfaces that taper in the direction of engagement have the disadvantage however, that they have a tendency to disengage again from the respective counter-acting surface upon the occurrence of large forces and especially of large torques when the wedge angle is greater than the wedge angle associated with a self-locking arrangement.

For this reason, a particularly expedient solution envisages that the interlocking elements should comprise interlocking surfaces which extend in parallel with the direction of engagement, this thereby preventing the interlocking elements from becoming disengaged in the face of excessively large forces or torques.

It is particularly expedient if these interlocking surfaces that extend in parallel with the direction of engagement adjoin the tapering interlocking surfaces so that, in the event that the interlocking elements are mutually displaced in a direction opposite to the direction of engagement due to the tapering interlocking surfaces, the surfaces extending in parallel with the direction of engagement will always ensure that the interlocking elements will remain in engagement.

In regard to the effectiveness of the interlocking elements, it is conceivable, for example, to construct them in such a manner that they are effective in one direction, whereas, for example, additional interlocking elements, for example in the form of stop members, lead to a blocking action in the other direction of rotation.

However, one particularly expedient solution provides for the pivotal element to be fixable relative to the pivot bearing body in two mutually opposite directions of rotation by means of the interlocking elements.

In accordance with the invention, one of the interlocking elements is constructed in the form of a projection which engages in the corresponding other one of the interlocking elements.

A projection of this type could be in the form of a tooth, a cam or a stud for example.

In connection with the previous explanation of the individual embodiments of the solution in accordance with the invention, no details have as yet been given in regard to the position in which the ball neck should be fixed in mutually non-rotatable manner relative to the pivot bearing body by the pivotal element.

Hereby, provision is preferably made for the pivotal element to be fixable in mutually non-rotatable manner relative to the pivot bearing body by means of the interlocking elements in at least the operative position of the ball neck.

In connection with the previous explanation of the solution in accordance with the invention, no detailed commentary has as yet been given as to how the process of fixing the pivotal element in the relevant position along the pivotal axis should be effected.

Thus for example, it would be conceivable to establish the individual positions as defined by an interlocking arrangement.

However, in order to make it possible to implement a play-free, mutually non-rotatable arrangement for fixing the pivotal element relative to the pivot bearing body in advantageous manner, provision is preferably made for the interlocking elements to be restrainable in the position thereof in which the pivotal element is fixed in mutually non-rotatable manner relative to the pivot bearing body by means of a wedge mechanism.

Restraint of the interlocking elements by an arrangement of this type serves to substantially eliminate the play whereby an arrangement for fixing the pivotal element relative to the pivot bearing body in play-free is thus obtained.

In regard to the construction of the pivot bearing body for the purposes of producing an interlocking arrangement for fixing the pivotal element, no extensive comments were made in connection with the previous explanation of the individual embodiments. Thus, it is particularly expedient if the interlocking elements are arranged between the pivotal element and a bearing element (also referred to herein as a "bearing cheek") of the pivot bearing body, and if the wedge mechanism is effective on the pivotal element on the one hand and on the bearing cheek on the other, whereby the pivotal element will be restrained against the bearing cheek by means of the wedge mechanism.

It would be conceivable for example, for the wedge mechanism to be effective indirectly on the bearing cheek supporting the at least one second interlocking element, for example, via a further bearing cheek provided on the pivot bearing body.

However, one particularly expedient solution provides for the wedge mechanism to engage the bearing cheek directly and thus restrain the pivotal element against this bearing cheek.

This solution has the great advantage that the pivot bearing body does not have to serve for diverting away the forces required for restraint purposes, but rather the forces are effective substantially between the pivotal element and the bearing cheek due to the direct effect of the wedge mechanism on the bearing cheek supporting the at least one second interlocking element, the remaining section of the pivot bearing body being unaffected by those forces that are required for restraint purposes.

A wedge mechanism of this type can be constructed in the most varied of manners.

One manner of implementing a wedge mechanism of this type would be by the use of an eccentric.

One form of wedge mechanism that has proved to be particularly expedient is one wherein the wedge mechanism is formed by two interengaging threads since such an arrangement is adapted to be driven in a simple manner, and in particular, by means of an electric motor drive.

In principle, it would be conceivable within the framework of the solution in accordance with the invention to employ a wedge mechanism merely for the purposes of restraining the interlocking elements.

However, it is particularly expedient if a wedge mechanism is provided for the purposes of producing the movement of the pivotal element along the pivotal axis relative to the pivot bearing body.

Basically, a wedge mechanism of this type could differ from the wedge mechanism that serves to restrain the interlocking elements.

However, a particularly expedient solution envisages that the selfsame wedge mechanism should serve for the displacement of the pivotal element relative to the pivot bearing body on the one hand, and also for restraining the interlocking elements on the other.

In regard to the wedge mechanism provided for the displacement of the pivotal element, it is likewise expedient if this is formed by two interengaging threads.

In principle, it would be conceivable within the framework of the solution in accordance with the invention for the displacement of the pivotal element relative to the pivot bearing body to be effected manually.

Furthermore, it would also be conceivable for the process of fixing the pivotal element in the relevant position relative to the pivot bearing body to be performed manually, i.e. a manual process of fixing it in the mutually non-rotatable fixed position or in the rotational position.

However, it is particularly expedient if the pivotal element is movable along the pivotal axis between the individual positions by means of a motorised drive, preferably by means of an electric motor.

Furthermore, it is likewise advantageous within the framework of the solution in accordance with the invention if the achievement of freedom from play when fixing the pivotal element relative to the pivot bearing body in mutually non-rotatable manner is effected by means of a motorised drive so that the process of fixing the pivotal element in the relevant position is achievable in motorised manner.

A wedge mechanism, which is used either for moving the pivotal element relative to the pivot bearing body or for restraining the interlocking elements in the position wherein the pivotal element is fixed non-rotatably or which is used for both of these purposes, has proved to be advantageous, especially in the case where a motorised drive is provided.

Hereby, a wedge mechanism in the sense of this invention should be understood as being a mechanism which functions with a wedge surface that extends at an angle to the direction of movement thereof. Wedge mechanisms of this type are, for example, sliding wedge drives, cam drives, eccentric drives or helical drives.

As yet, no particular details have been given in regard to the manner of initiating the pivotal movement of the pivotal element into the position thereof wherein it is rotatable relative to the pivot bearing body.

For example, it would be conceivable to pivot the pivotal element into the position thereof wherein it is pivotal relative to the pivot bearing body by manual action.

However, it has proved to be particularly expedient if, in the position thereof wherein it is pivotal relative to the pivot bearing body, the pivotal element is pivotal by means of a motorised drive, preferably by means of an electric motor, between an operative position and a rest position.

A motorised drive of this type may be a pivoting drive which is provided exclusively for the pivotal movement of the pivotal element.

However, as an alternative thereto, it is also possible to derive the pivoting drive from a motorised drive which is effective for the displacement of the pivotal element along the pivotal axis between the individual positions.

It would be conceivable for example, for this to be done by switchable couplings so that a displacement of the pivotal element relative to the pivot bearing body along the pivotal axis is achievable by means of a motorised drive on the one hand, and, for example, a pivotal movement of the pivotal element into the position wherein it is rotatable relative to the pivot bearing body is effected by means of the switchable couplings.

For reason of providing a solution that is as constructively simple as possible, another advantageous embodiment of the solution in accordance with the invention envisages that the pivoting drive be coupled via a torque producing coupling to the motorised drive that is used for the movement of the pivotal element between the mutually non-rotatable fixed position and the position in which it is rotatable relative to the pivot bearing body.

A torque producing coupling of this type may, for example, be a coupling which unlatches when a maximum torque is exceeded, or, it may be a friction clutch which does not simultaneously block the motorised drive that is used for the displacement of the pivotal element between the various positions when the pivotal movement of the pivotal element is blocked by means of stop members for example, but rather which makes it possible for the system to continue to run despite the blocked pivotal movement of the drive and is thus in the position of being able to move the pivotal element from the position wherein it is rotatable relative to the pivot bearing body into the mutually non-rotatable fixed position and vice versa despite the blockage to the pivotal movement.

In regard to the mounting of the pivotal element relative to the pivot bearing body, no detailed comments were made in connection with the previous explanation of the individual embodiments.

Thus, one particularly advantageous embodiment provides for the pivotal element to be mounted on the pivot bearing body by means of a bearing pin.

It is particularly expedient thereby if the pivotal element is rotatable relative to the bearing pin so that it is possible to have a relative movement therebetween.

When using a bearing pin, it is particularly expedient if a displacement of the pivotal element between the individual positions is attained by means of a displacement of the bearing pin.

In particular, it is thereby additionally possible to restrain the interlocking elements in the operative position by applying tension or pressure to the bearing pin for example.

However, when using a bearing pin relative to which the pivotal element is rotatable, it is also possible in the case of a constructively particularly expedient solution to mount the bearing pin in the pivot bearing body in such a manner that it is rotatable and to achieve a pivotal movement of the pivotal element relative to the pivot bearing body via the bearing pin.

It is particularly expedient thereby if a torque producing coupling is provided between the rotatably driven bearing pin and the pivotal element so that, by virtue of a rotatable drive for the bearing pin, the possibility then exists of pivoting the pivotal element between two stop members, for example, a stop member in the operative position and a stop member in the rest position, without the motorised drive then becoming blocked upon arrival at the position of the stop members.

This is especially advantageous in each of the solutions wherein the displacement of the pivotal element as well as the pivotal movement of the pivotal element is attainable by means of a single motorised drive.

In connection with the explanation of the individual embodiments of the solution in accordance with the invention, no details have as yet been given in regard to the positions of the pivotal element relative to the pivot bearing body. Thus, one particularly advantageous solution envisages that the pivotal element be movable along the pivotal axis between a position in which it is pivotal relative to the pivot bearing body and a holding position in which the pivotal element is fixed to the pivot bearing body in mutually non-rotatable manner.

That is to say, that in the case of this solution, there are provided at least two positions of the pivotal element relative to the pivot bearing body between which the pivotal element is movable backwards and forwards by means of a displacement along the pivotal axis. A particularly preferred solution thereby provides for the pivotal element to be in said one holding position both in the rest position of the ball neck as well as in the operative position of the ball neck.

That is to say, that in the case of this solution, the pivotal element is movable along the pivotal axis out of the holding position so as to enable it to be pivoted about the pivotal axis, for example from the rest position into the operative position or from the operative position into the rest position, and thereafter, to effect a movement of the pivotal element into the holding position so as to fix it relative to the pivot bearing body in interlocking manner.

Another advantageous solution provides for the pivotal element to be in a first position in the rest position of the ball neck, and for the pivotal element to be movable from said first position into the pivotal position and from the pivotal position into the holding position in which the ball neck is in the operative position.

That is to say, that in the case of this solution, there are provided at least three differing positions of the pivotal element between which this pivotal element is movable back and forth along the pivotal axis by a displacement process, whereby the first position and the holding position are arranged at opposite sides of the pivotal position so that a transfer from the rest position into the operative position or from the operative position into the rest position is effected by means of a movement in just a single direction, whereby, on each occasion, the pivotal position between these positions is reached wherein the pivotal movement of the ball neck from the operative position into the rest position can be effected.

In regard to the first position, no detailed comments have been made as to the manner in which the pivotal element could be fixed. For example, it would be conceivable to drive the pivotal element by means of a self-locking drive arrangement and to fix it in the first position simply by means of the self-locking action of the drive.

However, as the trailer coupling is intended to remain in the rest position for long periods of time and should be retained properly in this position, it is advantageous if said first position is likewise a holding position in which the pivotal element is fixed relative to the pivot bearing body in mutually non-rotatable manner.

This fixing process could be effected in a non-positive manner for example. However, it is particularly expedient if the pivotal element is fixed relative to the pivot bearing body in said first position by an interlocking arrangement, whereby the interlocking action does not have to be produced directly between the pivot bearing body and the pivotal element. It is also conceivable to provide the interlocking arrangement in the vicinity of the ball neck or in the vicinity of other elements, for example, of a stop cam.

In connection with the solution in accordance with the invention, we have not as yet gone into the operation thereof when using one or more motorized drives.

Thus, one particularly advantageous solution for the trailer coupling in accordance with the invention envisages that it should comprise a control system, and that the movements of the pivotal element from the operative position into the rest position and vice versa should be adapted to be monitored by said control system by means of at least one sensor.

In particular, provision is hereby made for the control system to interrupt the pivotal movement in the event of the control system detecting a deviation of the movement of the pivotal element from the predefined form of movement.

In accordance with the invention, such a deviation of the movement of the pivotal element from the predefined form of movement can be advantageously implemented, in particular, if the individual positions of the pivotal element are detectable by means of the sensor.

For example, it would be conceivable to constantly monitor the movements of the pivotal element by means of the sensor so as to ascertain whether they deviate from the predefined form of movement.

This can be implemented in a particularly expedient manner if the predefined movement of the pivotal element is capable of being monitored by a process of scanning a slider track that is correlated therewith.

In this case for example, the slider track can be shaped such that the sensor will not emit a signal when it can follow the slider track without hindrance whereas the sensor will emit a signal when there is a deviation from the slider track.

In order to enable the drive to be switched off in good time, especially in the case of a single drive, provision is preferably made for the control system to comprise a current monitoring arrangement for the motorised drive, and for the control system to interrupt the drive in the event that a predetermined maximum current level is exceeded.

The drive can thereby be switched off in a simple manner, for example, in the end positions.

Furthermore however, another conceivable possibility in the case of this solution is that of switching off the drive if the ball neck encounters an obstruction, the user of the motor vehicle for example, during the course of its pivotal movement.

Furthermore, the solution in accordance with the invention comprising the process of switching off the drive has the advantage that differing threshold values can be associated with the different phases of the movement, so that, for example, a high starting torque will be made available when starting the drive by virtue of a high threshold value, whereas, in each of the phases in which one might reckon with a collision between the ball neck and a part of the body of the user, the threshold value is set at a lower level.

Further features and advantages of the invention form the subject matter of the following description and the sketched illustration of several embodiments.

Figure 2:
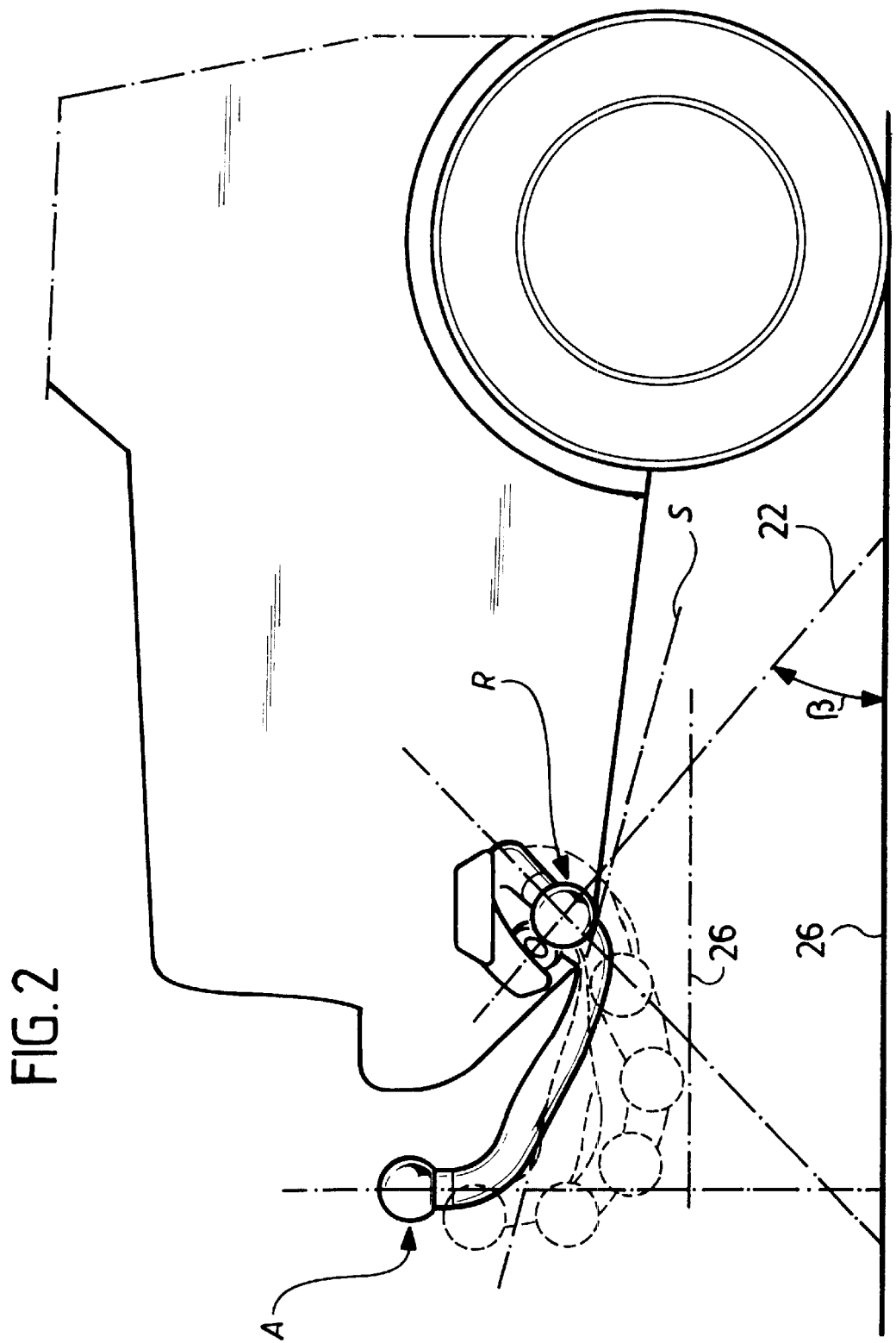
Figure 3:
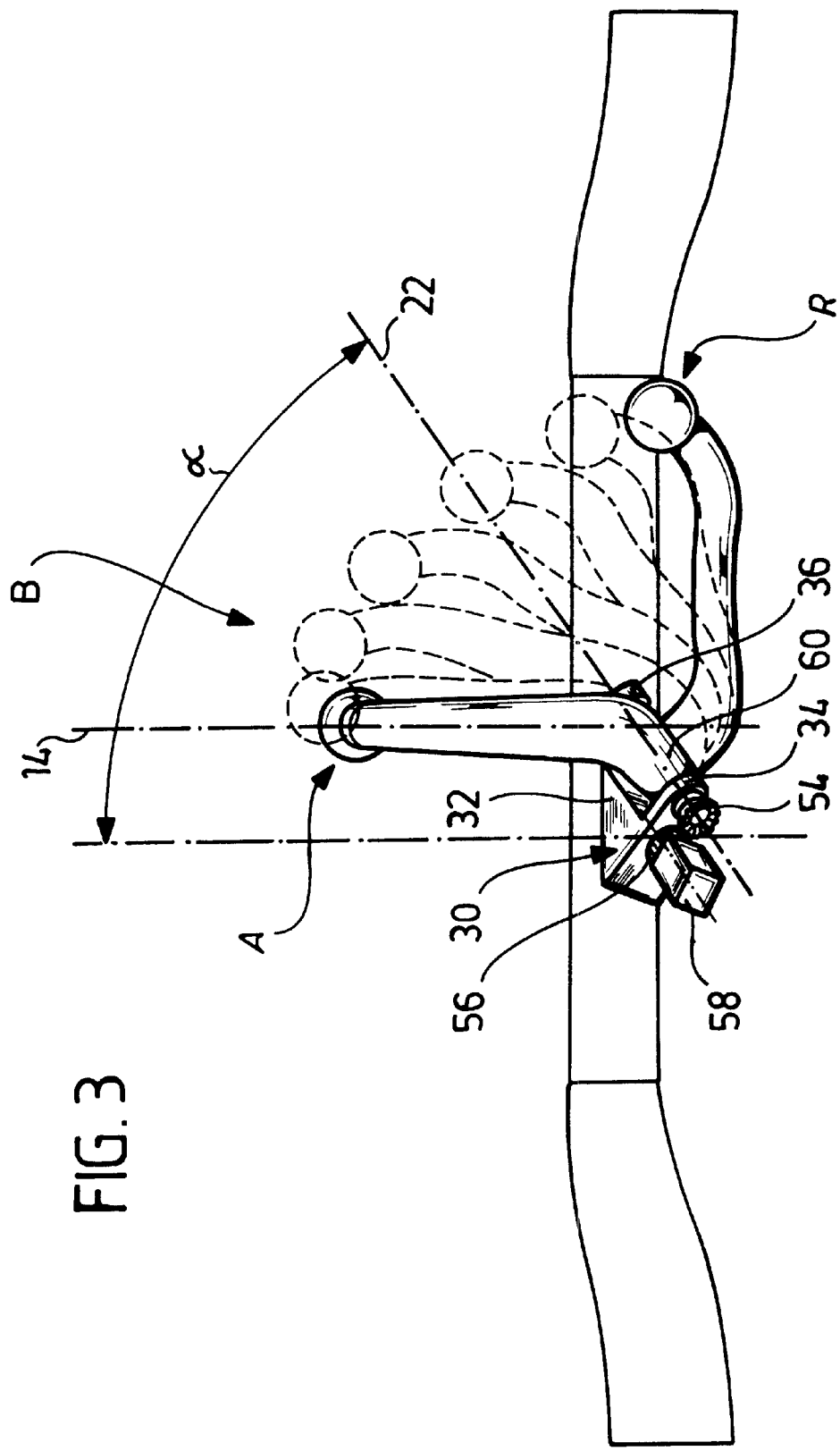
Figure 4:
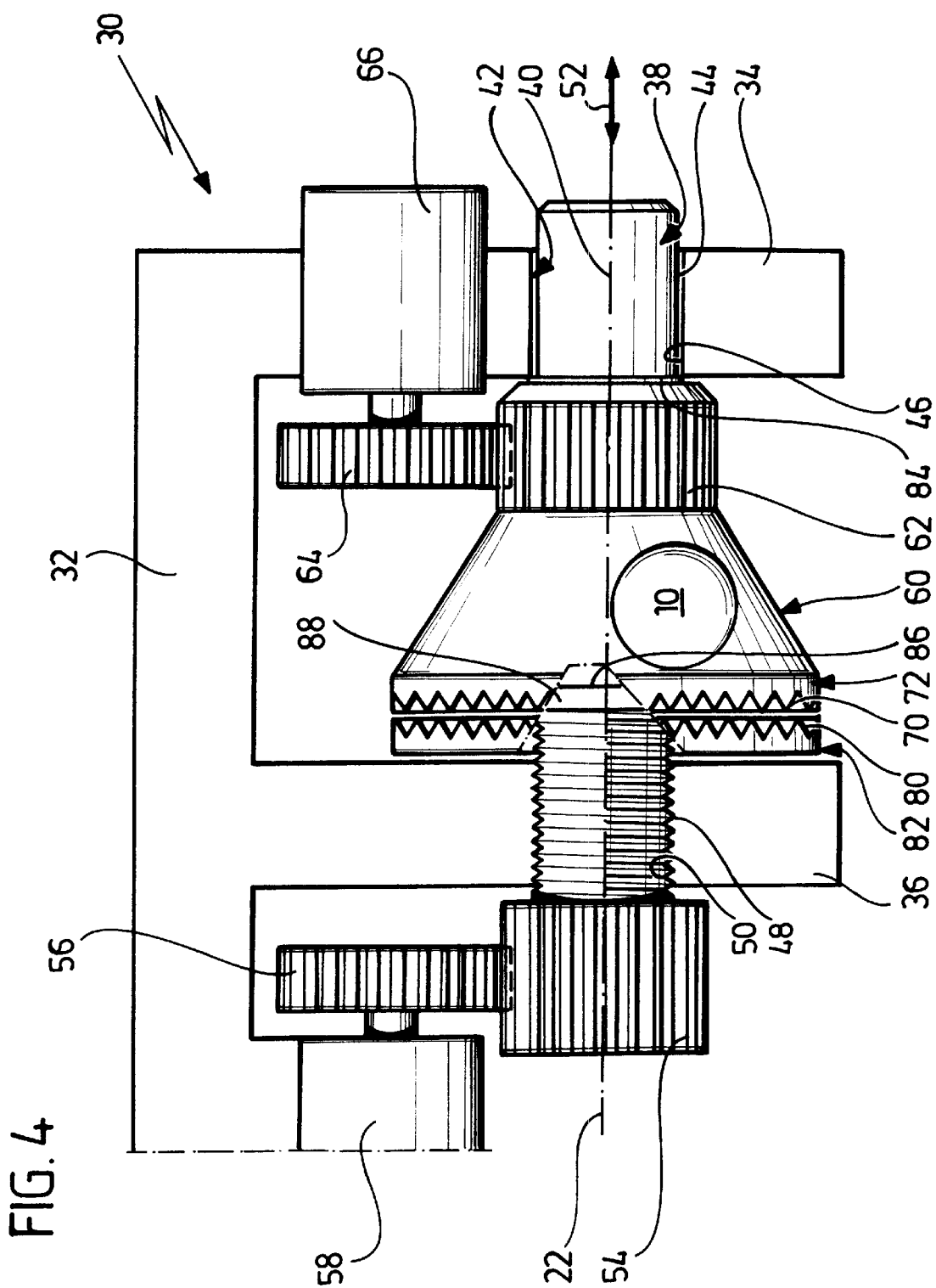
Figure 5:
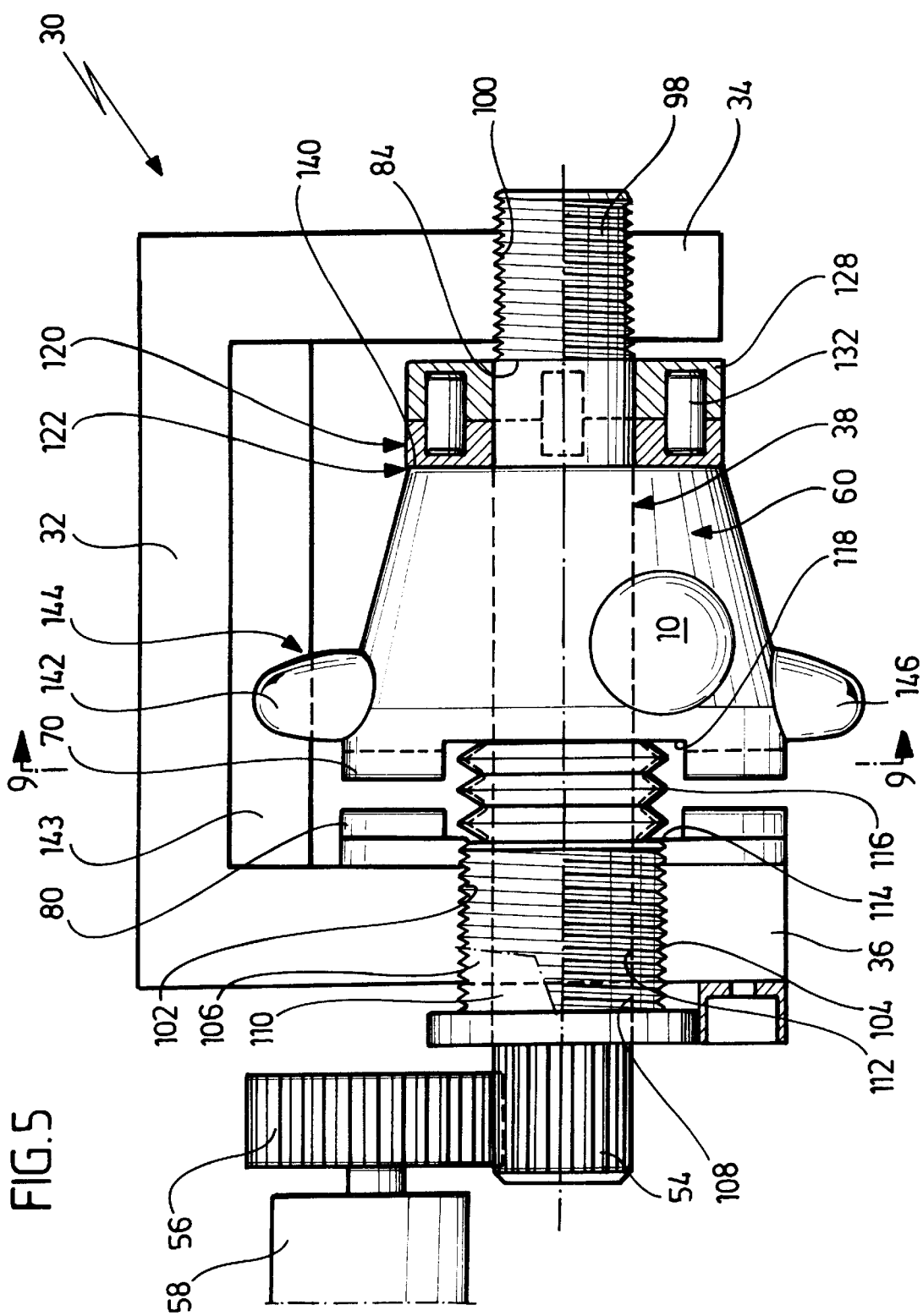
Figure 11:
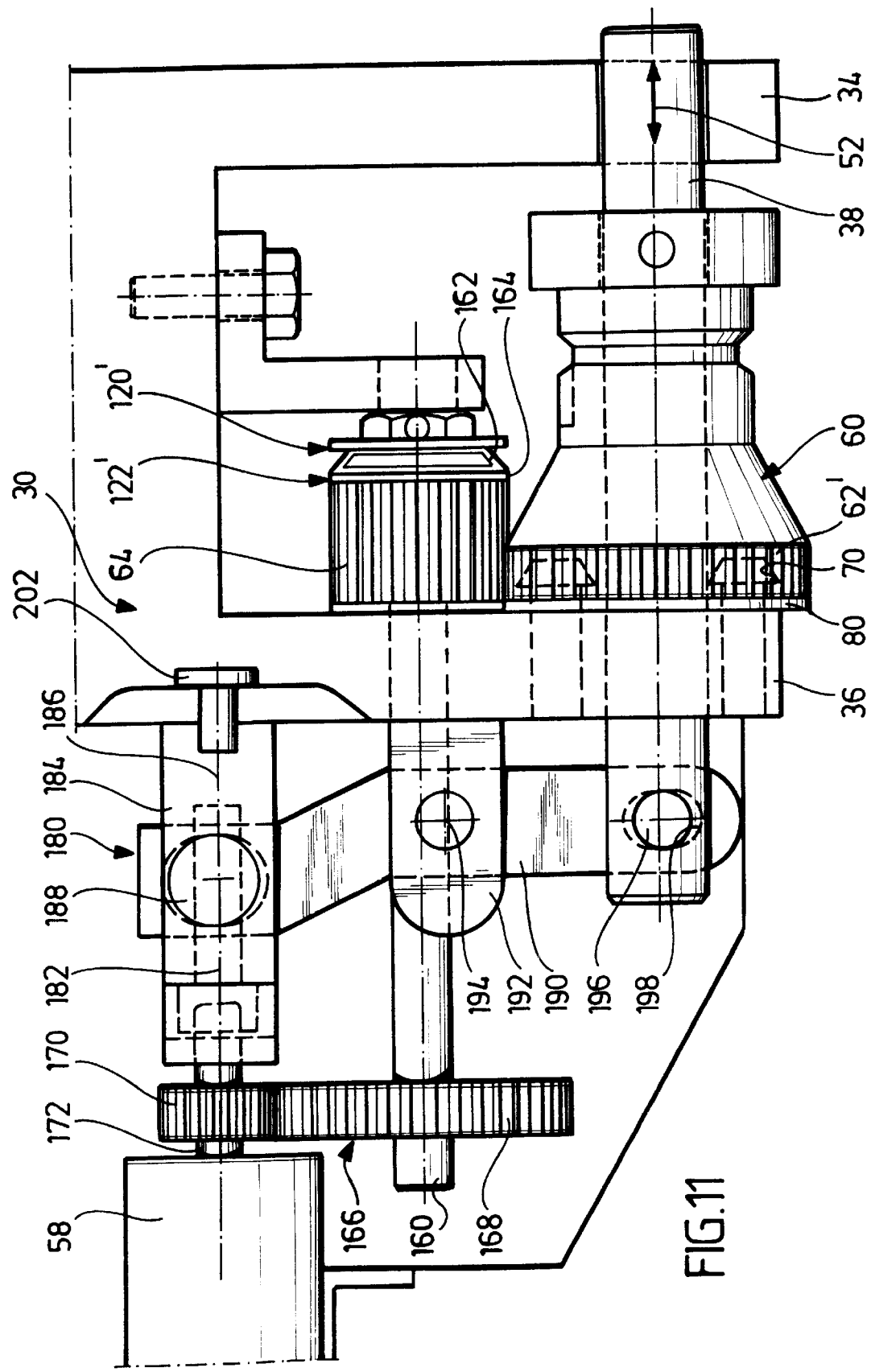
Figure 12:
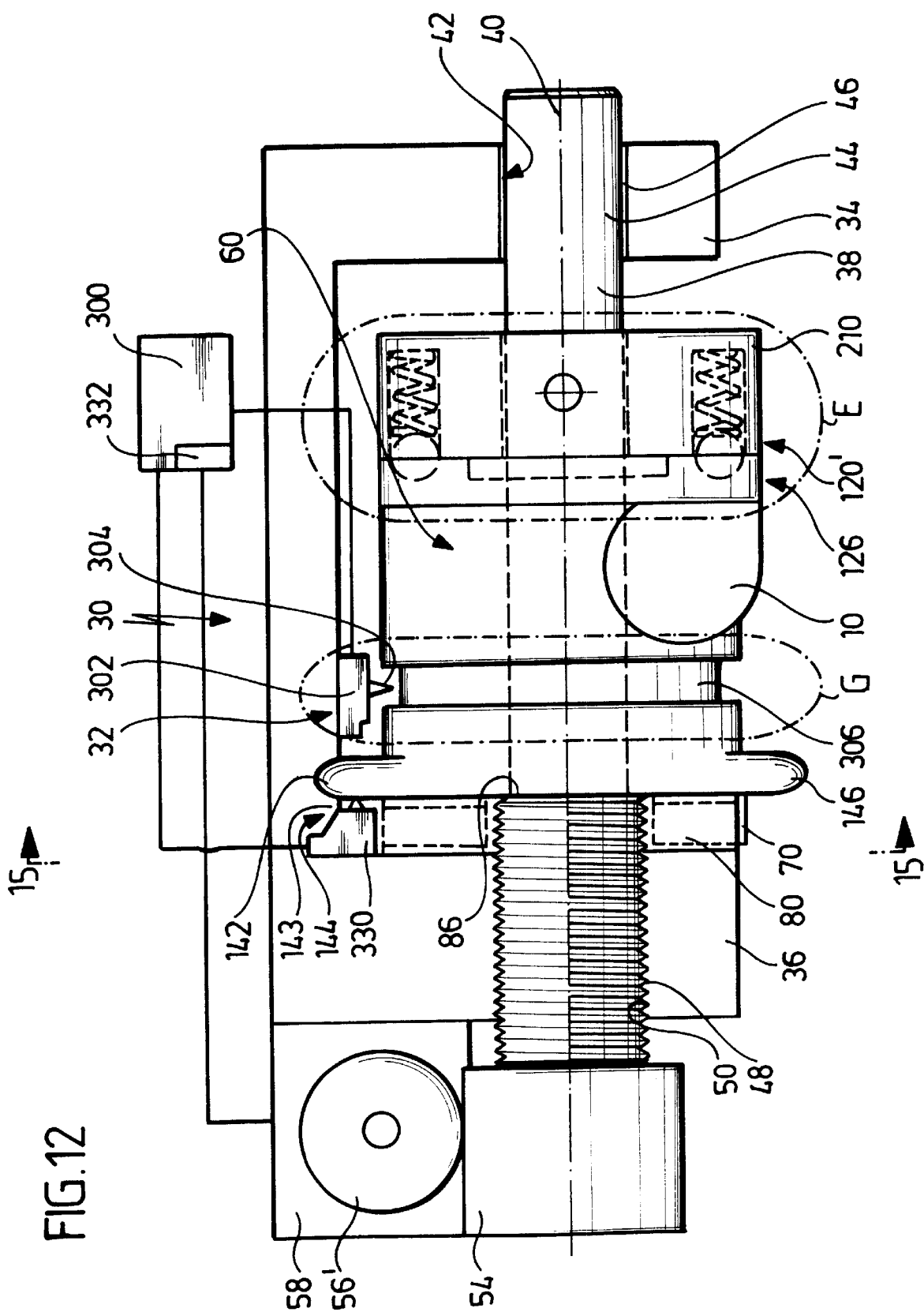
Figure 16:
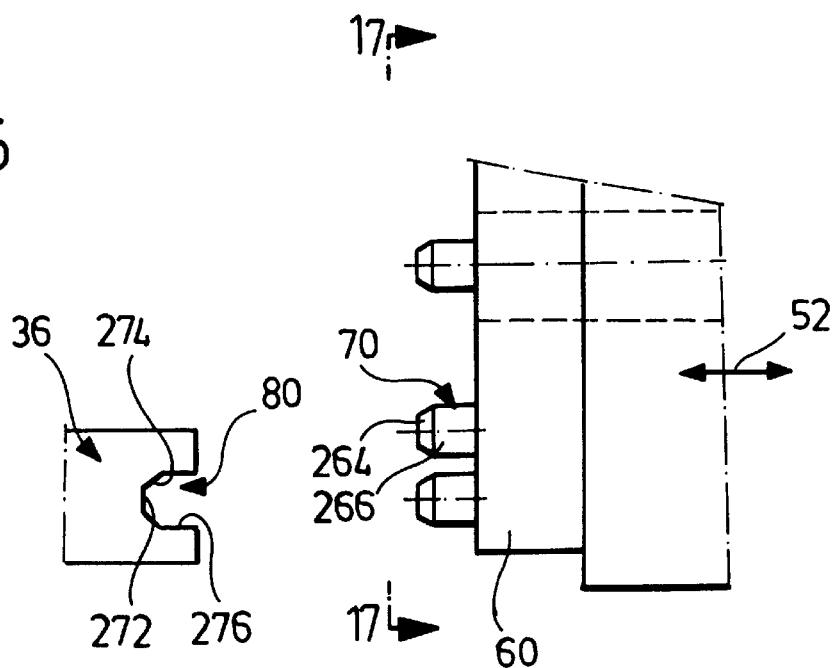
Figure 17:
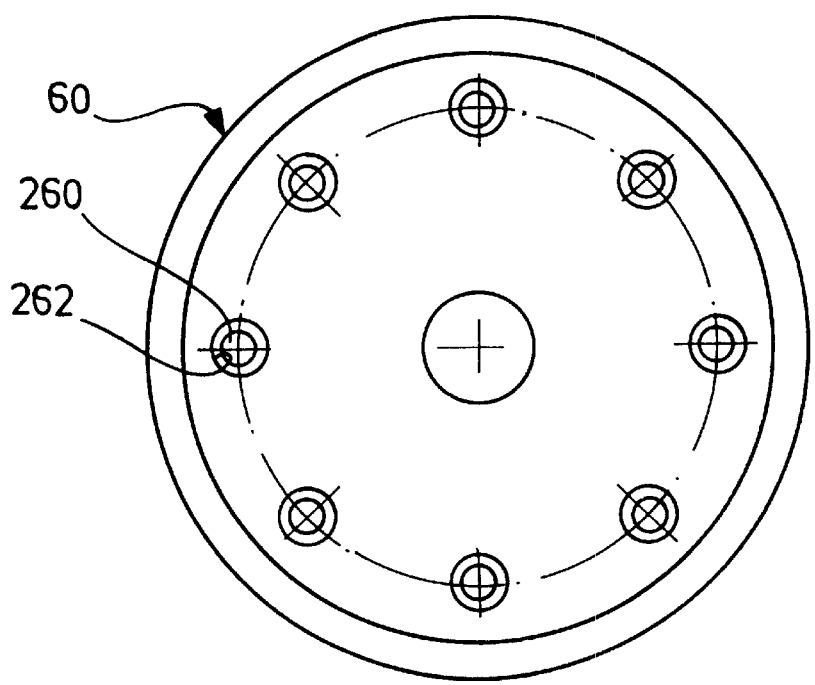
Figure 18:
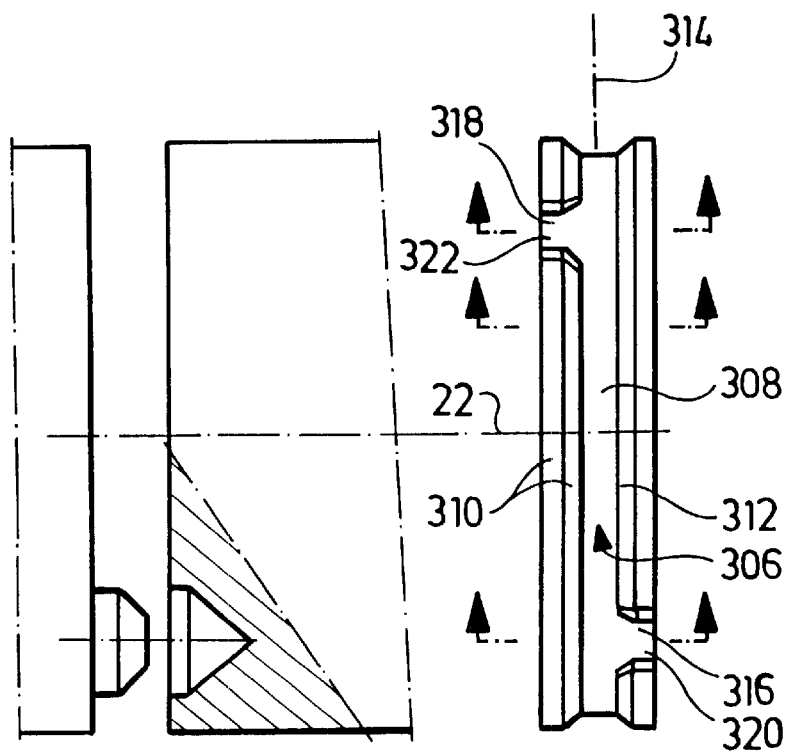
Figure 19:
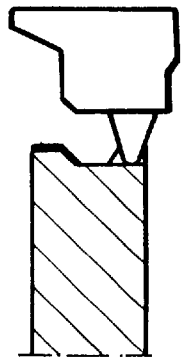
Figure 20:
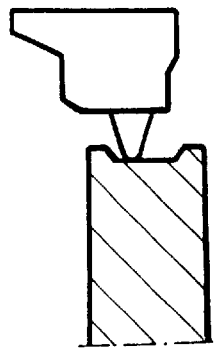
Figure 21:
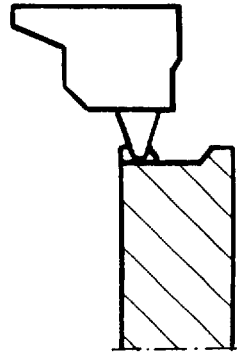

In the drawing:

FIG. 1 shows a rear view of a motor vehicle equipped with a trailer coupling in accordance with the invention;

FIG. 2 a section along the line 2—2 in FIG. 1;

FIG. 3 a top view in the direction of the arrow A in FIG. 1;

FIG. 4 a section through a first embodiment of a trailer coupling in accordance with the invention which is illustrated as viewed in the direction of the arrow B in FIG. 3;

FIG. 5 an illustration similar to FIG. 4 of a second embodiment of a trailer coupling in accordance with the invention;

FIG. 6 an illustration of a bearing pin of the second embodiment including part of the friction clutch;

FIG. 7 a top view of a further part of the friction clutch as viewed in a direction corresponding to an arrow C in FIG. 8;

FIG. 8 a section along the line 8—8 in FIG. 7;

FIG. 9 a section along the line 9—9 in FIG. 5 wherein a rest position has been reached;

FIG. 10 a view in the direction of the arrow D in FIG. 9;

FIG. 11 an illustration similar to FIG. 4 of a third embodiment;

FIG. 12 an illustration similar to FIG. 4 of a fourth embodiment;

FIG. 13 a sectionally enlarged illustration of the region E in FIG. 12;

FIG. 14 a sectionally enlarged illustration of the interlocking elements in the case of the fourth embodiment;

FIG. 15 a section along the line 15—15 in FIG. 12;

FIG. 16 an illustration similar to FIG. 14 or a first variant of the fourth embodiment;

FIG. 17 a top view corresponding to line 17—17 in FIG. 16;

FIG. 18 a sectionally enlarged illustration of a detection groove illustrated in the region G in the pivotal element corresponding to FIG. 12;

FIG. 19 the relative positioning between the detection groove and a probe in the mutually non-rotatable fixed position of the pivotal element which corresponds to the operative position of the ball neck;

FIG. 20 the relative positioning between the detection groove and a probe in the position of the pivotal element wherein it is pivotal relative to the pivot bearing body and FIG. 21 the relative positioning between the detection groove and a probe in the position of the pivotal element which corresponds to the rest position of the ball neck.

A trailer coupling in accordance with the invention which is illustrated in FIG. 1 comprises a ball neck 10 having a coupling ball 12, whereby the ball neck extends along a longitudinal central plane 14 of a motor vehicle 16 in an operative position A and the coupling ball 12 is located at the side of the ball neck 10 remote from a road surface 18.

In the coupling in accordance with the invention, this ball neck 10 is pivotal from an operative position A into a rest position R whereby the pivotal axis may be aligned in any arbitrary manner. The pivotal axis may extend perpendicularly to the longitudinal central plane 14 in a horizontal direction, the pivotal axis may extend in the longitudinal central plane 14 in an approximately vertical direction.

Moreover, as is illustrated in the case of the example in FIGS. 1, 2 and 3, it is conceivable to let the pivotal axis 22 extend at an angle α relative to the longitudinal central plane 14 of the motor vehicle 16, whereby the angle α lies in the range from approximately 40° to approximately 70°, and to let the pivotal axis 22 extend at an angle β relative to the horizontal 26 located in the longitudinal central plane 14, whereby the angle β lies in the range from approximately 30° to approximately 50°, and, moreover, to let the pivotal axis 22 extend at an angle γ relative to a horizontal 24 which is perpendicular to the longitudinal central plane 14 whereby the angle γ lies in the range from approximately 20° to approximately 40°.

Now a first embodiment of a trailer coupling in accordance with the invention that is illustrated in FIG. 4 comprises a pivot bearing body 30 which is used for mounting the ball neck 10 such as to be rotatable about the pivotal axis 22 and which comprises, for example, a base 32 and two bearing elements 34 and 36 (also referred to herein as bearing cheeks 34 and 36) which project from the base 32.

A bearing pin 38 that is rotatable about its axis 40 is mounted in the bearing cheeks 34 and 36, whereby the axis 40 represents the pivotal axis 22 for the ball neck 10.

Hereby, the mounting of the bearing pin 38 in the bearing cheek 34 is effected by means of a plain bearing 42 for example, this being formed by a peripheral surface 44 of the bearing pin 38 and a bearing bore 46 in the bearing cheek 34.

Furthermore, an external thread 48, which engages in an internal thread 50 in the bearing cheek 36, is provided on the bearing pin 38 in the section thereof penetrating the bearing cheek 36, 50) that rotation of the bearing pin 38 leads to the bearing pin 38 being displaceable relative to the bearing cheeks 34 and 36 in a direction 52 that is parallel to the axis 40 due to the interengaging threads 48 and 50.

For the purposes of rotatably driving the bearing pin 38, the latter is provided with a drive pinion 54 on the side of the bearing cheek 36 opposite the bearing cheek 34, said drive pinion 54 being engaged by a pinion 56 that is adapted to be driven by a drive 58, whereby the drive 58 preferably comprises an electric motor incorporating a reduction gear.

A pivotal element bearing the general reference 60 is seated on the bearing pin 38 between the bearing cheek 34 and the bearing cheek 36, said pivotal element being connected in mutually non-rotatable manner to a pivot pinion 62 which, for its part, is adapted to be driven by the pinion 64 for the purposes of creating a pivotal movement of the pivotal element 60 about the pivotal axis 22. To this end, the pinion 64 is driven by a pivoting drive 66 which likewise preferably comprises an electric motor incorporating a reduction gear.

Furthermore, on the side thereof facing the bearing cheek 36, the pivotal element 60 bears a support means 72 provided with first interlocking elements 70, whereby, in the simplest case, said support means is in the form of a toothed ring and is arranged concentrically of the axis 40 of the bearing pin 38.

The support means 72 is thereby connected to the pivotal element 60, on which moreover the ball neck 10 is formed, in mutually 7 non-rotatable manner and it is not displaceable in the direction 52 with respect to pivotal element 60.

In the simplest case, the ball neck 10, the pivotal element 60 and the support means 72 incorporating the first interlocking elements 70 are in the form of a one piece member.

Furthermore, a support means 82 comprising second interlocking elements 80 is arranged on the bearing cheek 36, namely, on the side thereof facing the support means 72 incorporating the first interlocking elements 70, whereby the second interlocking elements 80 face the first interlocking elements 70, and the first interlocking elements 70 and the second interlocking elements 80 are constructed in such a manner that they can engage one another to form an interlocking and play-free connection so as to fix the pivotal element 60 relative to the bearing cheek 36 in play-free and mutually non-rotatable manner.

The support means 82 is, for example, in the form of a separate member which is connected to the bearing cheek 36 in mutually non-rotatable manner and is not displaceable in the direction 52. However, it is also conceivable for the second support means 82 incorporating the second interlocking elements 80 to be formed in one piece on the bearing cheek 36.

Moreover, the bearing pin 38 is provided with a shoulder 84 on the side thereof facing the pivot pinion 62, said shoulder enabling the pivot pinion 62 to be displaced towards the bearing cheek 36 together with the pivotal element 60.

Moreover, the bearing pin 38 is additionally provided with a shoulder 86 which, for example, is formed by a ring 88 that is seated thereon and serves for displacing the pivotal element 60 towards the bearing cheek 34 in that said shoulder 86 abuts against pivotal element 60.

Consequently, the pivotal element 60 and the pivot pinion 62 are in fact adapted to be rotatable together, but they are mounted on the bearing pin 38 between shoulders 84 and 86 in such a manner that they are not substantially displaceable in the direction 52 with respect to bearing pin 38.

For the purposes of fixing the respective pivotal position of the pivotal element 60 relative to the bearing cheek 36 in mutually non-rotatable manner and thus of fixing it relative to the motor vehicle, the drive 58 is now set in motion so as to drive the drive pinion 54 via the pinion 56 whereby the drive pinion 54 is then in the position of being able to displace the bearing pin 38 in the direction 52, namely, either such that the interlocking elements 70 and 80 engage with one another, or such that these interlocking elements disengage whereby the pinion 64 and the pivot pinion 62 always remain in engagement.

Should the interlocking elements 70 and 80 be disengaged as is illustrated in FIG. 4, then it is possible to drive the pivot pinion 62 via the pivoting drive 66 and the pinion 64 and thus to pivot the pivotal element 60 together with the ball neck 10 from the operative position A into the rest position R or vice versa, whereby for example, the operative position A and the rest position R are detectable by means of an end switch so that the pivoting drive 66 can be stopped upon arrival at the respective position and maintenance of the pivotal position can thereby be effected.

In dependence upon whether the ball neck 10 is in the operative position A or in the rest position R, it is now possible to move the interlocking elements 70 and 80 into mutual engagement by operating the drive 58, whereby the bearing pin 38 applies pressure to the pivot pinion 62 and the pivotal element 60 in a direction towards the bearing cheek 36 and thus displaces them towards the bearing cheek 36 until such time as the first interlocking elements 70 are pressed into the second interlocking elements 80 in play-free manner.

Consequently, the pivotal element 60 together with the support means 72 and 82 and the interlocking elements 70 and 80 are restrained against the bearing cheek 36, whereby the bearing pin 38 is, for its part, fixed in the direction 52 in the internal thread 50 in the bearing cheek 36 by means of the external thread 48 and thus serves to apply tensile forces that are effective in the axial direction 52 thereof, whence a play-free arrangement for fixing the pivotal element 60 against the bearing cheek 36 is achieved by virtue of a restraint process.

In a second embodiment of the trailer coupling in accordance with the invention which is illustrated in FIG. 5, those parts that are identical to those of the first embodiment are provided with the selfsame reference numerals so that full reference may be made to the first embodiment in regard to the implementation of these parts.

In contrast to the first embodiment, the bearing pin 38 comprises an external thread 98 in the section thereof penetrating the bearing cheek 34, said external thread engaging in an internal thread 100 in the bearing cheek 34.

Furthermore, the bearing cheek 36 is provided with an internal thread 102 which is in engagement with an external thread 104 of an adjustment sleeve 106 that penetrates the bearing cheek 36 and comprises a bearing opening 108 which, together with a peripheral surface 110 of the bearing pin 38, forms a plain bearing 112 for the bearing pin 38.

Hereby, an end face 114 of the adjustment sleeve 106 is effective on a disc spring packet 116 which applies a resilient spring force to an end face 118 of the pivotal element 60 facing said end face 114, whereby the bias of the disc spring packet 116 can be adjusted by rotating the adjustment sleeve 106.

In contrast to the first embodiment, a separate drive motor for initiating and carrying out the pivotal movement of the pivotal element 60 is not provided in the second embodiment, but rather, the pivotal movement of the pivotal element 60 is derived from the rotational movement of the bearing pin 38.

For this reason, the pivoting drive 120 is provided in the form of a friction clutch 122 which comprises a first coupling ring 128 that is connected to the bearing pin 38 in mutually non-rotatable manner, for example, by means of a pin 130, and has cam-like projections 132 thereon which engage in depressions 134 of a second coupling ring 136 that it is provided with a friction surface 138 on the side thereof opposite the depressions 134, said friction surface resting on a facing friction surface 140 of the pivotal element 60.

Hereby, the depressions 134 are formed in such a manner that the cams 132 can rotate through a fixed angle α with respect to the axis 40 so that the second coupling disc 136 is rotatable to a limited extent through the angle α relative to the first coupling disc 128.

Furthermore, the pivotal element 60 is also provided with a first stop cam 142 that is adapted to be applied to a first stop face 143 of a stop web 144 when the ball neck has reached the operative position during the course of its pivotal movement from the rest position into the operative position A, whereby said first stop face extends in parallel with the pivotal axis 22 and is a first stop face 143 provided on the pivot bearing body 30. Furthermore, a second stop cam 146 is arranged on the pivotal element 60, said second stop cam being adapted to be applied to a second stop face 145 of the stop web 144 upon reaching the rest position R.

Since the pivotal element 60 traverses a pivotal angle of approximately 200° in the course of the pivotal movement of the ball neck 10 from the operative position A into the rest position R or vice versa, the stop cam 142 is moved away from the stop face 143 through an angular distance of up to approximately 200° whereby, upon reaching such a position, the stop cam 146 comes to rest on the second stop face 145 SO as to prevent any further rotational movement of the ball neck 10 after it has reached the rest position R, or, the second stop cam 146 moves away from the second stop face 145 until the first stop cam 142 reaches the first stop face 143.

Moreover, for the purposes of fixing the ball neck 10 in the rest position R, there is also associated with the stop web 144 a pocket 148 into which the stop cam 146 resting on the second stop face 145 will enter by virtue of a movement towards the bearing cheek 34, this movement being produced as a result of the stop cam 146 striking the second stop face 145 during the pivotal movement of the pivotal element 60 about the pivotal axis 22 and thereby preventing further rotation of the pivotal element 60, whereby the ball neck 10 has already reached the rest position R in this pivotal position. However, due to the fact that the drive 58 continues to run, there will be a further rotation of the bearing pin 38 50 that a displacement of the bearing pin 38 towards the bearing cheek 34 will occur due to the external thread 98 engaging in the internal thread 100, whereby the coupling rings 128 and 136 will also continue to move towards the bearing cheek 34 so that, due to the effect of the spring packet 116, a movement of the pivotal element 60 towards the bearing cheek 34 will also occur and thus there will be a displacement of the second stop cam 146 towards the bearing cheek 34 and a consequent movement thereof into the pocket 148, for example, until such time as the stop cam 146 rests on a base surface 149 of the pocket and is retained thereon due to the disc spring packet 116.

The pocket 148 now leads to the pivotal element 60 being fixed in the rest position R such that it cannot rotate about the pivotal axis 22 by virtue of an interlocking arrangement, and thus leads to the fixing of the ball neck 10 in the rest position R in interlocking manner as is illustrated in FIGS. 9 and 10.

Now, the second embodiment of the trailer coupling in accordance with the invention functions in the following manner.

For as long as the interlocking elements 70 and 80 are not in mutual engagement, the friction surface 140 of the pivotal element 60 and the friction surface 138 of the second coupling ring 136 will be held in contact by the disc spring packet 116, since the latter is effective on the end face 118 of the pivotal element 60 whilst the pivotal element 60 is freely rotatable on the bearing pin 38 and is mounted such as to be displaceable in the direction 52. The disc spring packet 116, whose bias tension is adjustable by the adjusting sleeve 106, thereby maintains the friction surfaces 140 and 138 in constant contact with one another.

Furthermore, apart from the relative rotatability of the first coupling disc 128 relative to the second coupling disc 136 through the angle α, there is a mutually non-rotatable connection via the coupling discs 136 and 128 to the bearing pin 38 due to the mutually non-rotatable connection of the first coupling disc 128 to the bearing pin 38 when the friction surfaces 138 and 140 are not sliding upon each other. A rotation of the pivotal element 60 will thereby be produced in the course of a rotation of the bearing pin 38 by means of the drive 58 via the pinion 56 and the drive pinion 54, insofar as the pivotal element is not restricted by the stop cam 142 or the interlocking elements 70 and 80.

If the ball neck 10 is in the rest position R and if the drive 58 is now switched on, then a rotation of the bearing pin 38 about the axis 40 due to the external thread 98 thereof engaging in the internal thread 100 will result in a displacement of the pivotal element 60 in the direction 52 until such time as the second stop cam 146 has left the pocket 148 and thereafter will cause a pivotal movement of the ball neck 10 from the rest position R towards the operative position in the course of a simultaneous displacement of the coupling discs 128 and 136 together with the pivotal element 60 towards the bearing cheek 36 until such time as the predefined angle of approximately 200° has been run through and the first stop cam 142 has come to rest on the first stop face 144.

Hereby, the thread 98 of the bearing pin 38 is adjusted relative to the internal thread 100 such that, in this case, the interlocking elements 70 and 30 will still continue to remain out of engagement.

At the moment when the stop cam 140 interrupts the pivotal movement of the pivotal element 60 and the ball neck 10 due to it coming to rest on the step face 144, a further rotation of the bearing pin 38 by means of the drive 58 will lead to slippage of the friction clutch 122 whereby the cams 132 will then rest in the depressions 134 in the wall 134a thereof that is to the front in the direction of rotation.

Upon further rotation of the bearing pin 38, there will be a further displacement of the pivotal element 60 towards the bearing cheek 36 due to the external thread 98 engaging in the internal thread 100, such displacement continuing until such time as the interlocking elements 70 and 80 engage with one another and are mutually restrained by the bearing pin 38.

In this position, the pivotal element 60 and the ball neck 10 are fixed to the pivot bearing body 30 in the operative position in mutually non-rotatable and play-free manner.

If the interengaging interlocking elements 70 and 80 should now be released, then the drive 58 is controlled in such a manner that the bearing pin 38 will rotate in the reverse direction. In this case, the external thread 98 engaging in the internal thread 100 in the bearing cheek 34 ensures that the pivotal element 60 will move away from the bearing cheek 36 and hence away from the second interlocking element 80 until such time as the interlocking elements 70 and 80 disengage. During this period of time, the friction surfaces 138 and 140 will slide relative to one another.

Now the depressions 134 and the relative rotatability of the first coupling disc 128 relative to the second coupling disc 136 have the advantage that, at the beginning of the rotational movement of the bearing pin 38 and with the mutually restrained interlocking elements 70 and 80 still being interengaged, the force, which is effective on the coupling element 60 via the coupling discs 128 and 136 for the purposes of restraining the interlocking elements 70 and 80, does not contribute to an increase in the static friction between the friction surface 138 and the friction surface 140 since, at the beginning of the pivotal movement of the bearing pin 38, it is possible for the cams 132 to move from the wall 134a containing the depressions 134 towards the wall 134b through the angular distance α, so that the second coupling ring 136 can initially remain stationary relative to the pivotal element 60 due to the static friction, whereas the first coupling ring 128 will have already rotated through the angle α. This angle α is sufficient for obtaining a relative displacement of the first coupling ring 128 towards the bearing cheek 34 due to the external thread 98 engaging in the internal thread 100, and for contributing towards a reduction in the force on the friction surfaces 138 and 140 so that finally, it is essentially only the bias force of the disc spring packet 116 that is again mainly responsible for the force between the friction surfaces 138 and 140, and consequently, the static friction can be overcome by virtue of torques that are in the usually envisaged order of magnitude.

In a third embodiment which is illustrated in FIG. 11, those elements that are identical to those of the preceding embodiments are provided with the selfsame reference numerals so that full reference may be made to the explanations given with respect to the preceding embodiments in regard to the functioning thereof.

In contrast to the first embodiment, the pivotal element 60 is provided with a toothed gear in the region thereof of greatest diameter and thus itself forms the pinion 62' in the region thereof provided with the toothed gear, said pinion 62' being in engagement with the pinion 64 which serves for driving the pivotal element 60 in regard to the pivotal movement thereof between the operative position A and the rest position R.

Moreover, in contrast to the first embodiment but following on from the second embodiment, the pinion 64 is not driven by its own drive but rather, by means of a pivoting drive 120' which comprises a friction clutch 122' that is effective between a drive shaft 160 mounted in the bearing cheek 36 and the pinion 64 and, for example, is effective on an end face 164 of the pinion 64 through a friction disc 162.

Furthermore, the drive shaft 160 is driven via a toothed gear mechanism 166 which comprises two gear wheels 168 and 170, whereby the gear wheel 168 is seated on the drive shaft 160 and the gear wheel 170 is seated on a shaft 172 of the drive 58.

In addition, the shaft 172 in the drive 58 simultaneously drives an actuator arrangement bearing the general reference 180 which comprises a threaded spindle 182 that is mounted in a spindle bearing unit 184 such as to be rotatable about the spindle axis 186 thereof but which is not axially displaceable along its spindle axis 186.

Hereby, the threaded spindle 182 penetrates through a spindle nut 188 which is mounted such as to be displaceable in the spindle mounting unit 184, and which is displaceable along the spindle axis 186 by rotation of the spindle 182.

The spindle nut 188 is thereby effective on a bell crank 190 which is mounted in an intermediate bearing 192 and is adapted to tilt about a tilt axis 194.

Furthermore, an actuating element 196, which is in the form of a pin for example, and which penetrates an eye 198 in the bearing pin 38, is arranged on the lever 190.

The eye 198 is arranged in the bearing pin 38 on the side of the bearing cheek 36 opposite the pivotal element 60 for example.

If the crank 190 is now tilted due to the movement of the spindle nut 188 by means of the spindle 182, then the bearing pin 38 can be displaced in the direction 52 so as to move the interlocking elements 70 and 80 into engagement or out of engagement with one another.

Hereby, the pivotal element 60 is mounted on the bearing pin 38 such as to be freely rotatable but it is not displaceable in the direction 52, and, due to the fact that the pinion 64 and the pivot pinion 62' are in engagement independently of the displacement of the pivotal element 60 in the direction 52, it always remains capable of being driven.

Moreover, in order to provide a simple manner for releasing the arrangement in an emergency, the spindle bearing unit 184 is releasably attached to the pivot bearing body 30 as a whole, for example, by means of a screw 202.

In an emergency, for example, in the event of a defective drive 58 or a defective power supply for the drive 58, the drive 58 is removed at one side together with the shaft 172 and the gear wheel 170. Thereafter, the whole spindle bearing unit 184 can be released from the pivot bearing body 130 by loosening the screw 202 and consequently, the crank 190 can be tilted to such an extent as to allow the displacement of the pivotal bearing 60 together with the bearing pin 38 towards the bearing cheek 34 whereby the interlocking elements 70 and 80 will become disengaged. In this position, the ball neck 10 can then be manually pivoted back and forth between the operative position A and the rest position R, whereafter it can be fixed, in the operative position A for example, by again fixing the spindle bearing unit 184 to the pivot bearing body 30 by means of the screw 202.

In a manner similar to that of the second embodiment, there may be provided a stop element and stop cams which limit the pivotal movement of the pivotal element 60 in the operative position and in the rest position, whereby these will not be described in detail again in connection with the third embodiment.

In a fourth embodiment which is illustrated in FIG. 12, those parts that are identical to those of the first and second or third embodiments are provided with the selfsame reference numerals so that full reference may be made to the first and the second embodiment in regard to the description thereof.

In the case or the third embodiment, the rotational movement of the pivotal element 60 is likewise derived from the rotational movement of the bearing pin 38, whereby the latter, as described in the first embodiment, is rotatable in an internal thread 50 in the bearing cheek 36 by means of its external thread 48 and it is displaceable in the direction 52.

However, for driving the bearing pin 38, a worm drive 56' is provided instead of the pinion 56, said worm drive thus forming a self-locking drive in combination with the drive pinion 54.

Furthermore, the pivoting drive 120' is not provided with a friction clutch but with a latching coupling 124. To this end, a mutually non-rotatably connected coupling disc 210 is provided with the bearing pin 38, wherein, as is illustrated once more on an enlarged scale in FIG. 13, there are provided guide channels 212 for latching bodies 214, preferably latching balls, whereby a pressure spring 216 is also provided in the guide channels 212, said pressure spring 216 being supported at one end on a base 218 of the respective guide channel 212 and pressing against a rear side 220 of the latching body 214 facing the base 218 at the other end thereof, whereby, for its part, a front face 222 of said latching body engages in a dome-like depression 224 which is arranged in an end face 226 of the pivotal element 60 facing the coupling ring 210.

Preferably, a plurality of dome-like depressions 224 of this type are provided in the end face 226 such that they are rotationally symmetrical relative to the axis 40, and a plurality of cam bodies 214 that are likewise distributed in rotationally symmetrical manner relative to the axis 40 are provided in the coupling ring 210.

Furthermore, in a manner similar to that of the first embodiment, the pivotal element 60 rests on the shoulder 86 of the bearing pin 38 so that the pivotal element 60 in the case of the fourth embodiment is guided between the shoulder 86 and the coupling ring 210 that is rigidly connected to the bearing pin 38 in such a manner that it is not displaceable in the direction 52 but nevertheless is rotatable relative to the bearing pin 38 about the axis 40.

In the case of the third embodiment, the interlocking elements 70 and 80 are preferably, as illustrated in FIGS. 14 and 15, in the form of interlocking elements that comprise respective interlocking surface regions 232 and 242 which, at one end, taper conically from the front in the direction 52 towards the respective other interlocking element 70 and 80, and, adjoined thereto, respective interlocking surface regions 234 and 244 which extend approximately in parallel with the direction 52 and which are then followed by the respective interlocking surface regions 236 and 246 that widen in a direction towards the respective other interlocking element 80, 70 and are located opposite the interlocking surface regions 232 and 242 taken with reference to the interlocking surface regions 234 and 244.

Hereby, interlocking elements of this type are constructed in such a manner that the interlocking surface regions 236 and 246 accommodate the respective front interlocking surface regions 242 and 232 of the respective other interlocking element 80, 70 in play-free manner when pressing the interlocking elements 70, 80 into one another, whereas the respective interlocking surface regions 234 and 244 represent a form of security arrangement for preventing the interlocking elements 70, 80 from loosening in the face of an excessively large torque since, independently of the size of the torque, they cannot be released because of the shape thereof parallel to the direction 52.

The interlocking elements 70 are preferably arranged on a ring 250 for example, said ring being seated on an end face 252 of the pivotal element 60 facing the bearing cheek 36 and being connected to the pivotal element 60 such that they are mutually non-rotatable, and, in addition, it is not displaceable in the direction 52.

The interlocking elements 80 are arranged on a not illustrated ring in a similar manner, whereby both of the rings supporting the interlocking elements 70, 80 are producible in the form of identical rings.

A serration is, for example, provided as being an example of a toothed gear.

In a variant of the third embodiment which is illustrated in FIGS. 16 and 17, the first interlocking elements 70 are constructed in a simpler manner than in the fourth embodiment.

Hereby, the first interlocking elements 70 are cylindrical studs 260 which are inserted in borings 262 in the pivotal element 60 and have a conically tapering interlocking surface region 264 on the end face thereof, whilst an interlocking surface region 266, which is formed by the cylindrical outer surface of the pin 260 and extends in parallel with the direction 52, is adjoined to the side of the interlocking surface region 264 facing the pivotal element 60.

In this case, the second interlocking elements 80 are in the form of cylindrical blind holes 270 which have conically widening surfaces 274 adjoining a base 272 of the hole, these surfaces representing the conical interlocking surface regions and accommodating the conical interlocking surface regions 264 of the pins 260 in play-free manner. Cylindrical wall surfaces 276 of the blind holes 270, which form the interlocking surface regions extending in parallel with the direction 52 and which accommodate the corresponding interlocking surface regions 266 of the pins 260, adjoin these conical interlocking surface regions 274 at the side thereof located opposite to the base 272 of the holes.

The solution in accordance with the first variant of the third embodiment has the advantage that the pins 210 can be produced in a simple manner and can easily be anchored in the pivotal element 60 whereby, in addition, the blind holes 270 can easily be produced in the bearing cheek 36 at the same time.

In the case of the first variant of the third embodiment, the interlocking elements 70 and 80 are preferably arranged to have the same angular spacing about the axis 40 and to be located at the same radial spacing therefrom so that there will be rotational symmetry with respect to the axis 40.

In the fourth embodiment, the pivotal element 60 is also provided with two stop cams 142 and 146 which co-operate with stop faces 143 and 145 of the stop element 144. In regard to these features, reference should be made to the explanations in respect of the second embodiment.

Furthermore, a pocket 148 for fixing the pivotal element in the rest position R is also associated with the stop face 145.

The fourth embodiment thus functions in a manner similar to that of the second embodiment.

If, in the case of the third embodiment, the ball neck 10 is in the rest position R thereof, then the stop cams 142 likewise have an angular spacing of approximately 200° relative to the first stop face 143.

In the rest position R, the ball neck 10 is held exclusively by the latching coupling 126.

If pivoting of the ball neck 10 into the operative position A should now be effected, then the drive 58 is switched on and the bearing pin 38 is rotated whereby the external thread 48 of the bearing pin 38 engaging in the internal thread 58 in the bearing cheek 36 in the case of a releasing latching coupling 124, results in a linear displacement of the pivotal element 60 from the position thereof most distantly located from the bearing cheek 36, which corresponds to the rest position R wherein the stop cam 146 engages in the pocket 148, into a position located closer to the bearing cheek 36 in which the latching coupling 126 is engaged, and the pivotal element 60 together with the bearing pin 38 pivots, with a simultaneous pivotal movement of the ball neck 10, until such time as the stop cam 142 rests on the stop face 143 whereby this resting action corresponds to the arrival of the ball neck 10 in the operative position A with reference to the pivotal movement thereof about the pivotal axis 22. The latching coupling 126 remains in engagement during the entire pivoting process so that the pivotal movement of the ball neck 10 corresponds to the rotational movement of the bearing pin 38.

However, the consequence of the process involving the stop cam 142 coming to rest on the stop face 144, is that further rotational movement of the pivotal element 60 and the ball neck 10 is prevented so that the latching coupling 126 is now released in the event of any further rotation of the bearing pin 38, whereby the cam bodies 214 are moved out of the dome-shaped depressions 224 and thereby run out over the end face 226, for example, into the next dome-shaped depression 224.

This permits the bearing pin 38 to continue to rotate and also permits the interlocking elements 70, 80, which initially are not yet in engagement when the stop cam 142 strikes the stop face 144, to be brought into engagement by a displacement of the pivotal element 60 towards the bearing cheek 36, whereby the bearing pin 38 finally holds the interlocking elements 70, 80 such that they are pressed into one another and restrained against each other so that the pivotal element 60 and hence too, the ball neck, is fixed to the bearing cheek 36, and thus too, to the pivot bearing body 30, in mutually non-rotatable and play-free manner. Once this position has been reached, the drive 58 can be switched off, for example, by determining that a maximum torque level has been exceeded.

Should one wish to release the ball neck 10 from its locked state in the operative position A, then the direction of the drive 58 is reversed whereby the bearing pin 38 will be rotated in the reverse direction. Initially, this leads to a displacement of the pivotal element 60 away from the bearing cheek 36 since the interlocking elements 70, 80 continue to prevent the pivotal element 60 from rotating. It is only when the pivotal element 60 has been displaced sufficiently far from the bearing cheek 36 in the direction 52 as to allow the interlocking elements 70 and 80 to disengage, that a rotational movement of the pivotal element 60 can be effected by the engagement of the latching coupling 126, although this is preferably only effected in synchronism with the bearing pin 38, when the cam bodies 214 engage once more in the dome-shaped depressions 224.

For the purposes of operating the trailer coupling in accordance with the invention, there is provided a control system 300 which firstly serves for controlling the drive 58 and also serves for supplying current thereto, as is illustrated by way of example in connection with the fourth embodiment which is illustrated in FIG. 12.

The control system 300 remotely interrogates a sensor 302 which engages in a detection groove 306 in the pivotal element 60 by means of a probe nose 304.

As is illustrated in detail in FIG. 18, the detection groove 306 comprises a central section 308 which extends between two groove walls 310 and 312 and then merges into a transverse section 316 or 318, whereby the transverse section 316 of the detection groove 306 in the direction of the pivotal axis 22 is in the form of a recess 320 in the wall 312 of the groove, whereas the transverse section 318 is in the form of a recess 322 in the wall 310 of the groove.

The endmost transverse sections 316 and 318 together with the central section 308 of the detection groove 306 serve for monitoring the correct movement of the pivotal element 60 in the course of its pivotal movement from the rest position R into the operative position A thereof.

If, for example, the pivotal element 60 is in the operative position A, then the probe nose is located in the transverse section 316 of the detection groove 306, as is illustrated in FIG. 19.

If the drive 58 is now controlled by the control system 300 in such a manner as to indicate that the pivotal element 60 should be released from the operative position A, then this initially leads, as has already been described, to an exclusively linear displacement of the pivotal element 60 away from the bearing cheek 36 until such time as the interlocking elements 70 and 80 disengage.

Now the central section 308 of the detection groove 306 is arranged relative to the transverse section 316 in such a manner that the probe nose 304 will be in the central section 308 just at that moment when the interlocking elements 70 and 80 disengage and the pivotal element 60 begins to rotate.

In this case, the probe nose 304 is in the central section and can thus move along the central section 308 of the detection groove 306 so that it is possible for the pivotal element 60 to rotate without causing the probe nose 304 to collide with the groove walls 310 or 312.

Hereby, the spacing between the groove walls 310 and 312 is selected to be such that the linear displacement, which additionally occurs during the pivotal movement of the pivotal element 60 from the operative position A into the rest position R, will also not lead to a collision between the probe nose 304 and the groove walls 310 or 312.

The rotation of the pivotal element 60 is effected until such time as the probe nose 304 in the central section 308 is approximately at the level of the transverse section 318 and the second stop cam 146 is resting on the corresponding stop face 154, this thereby defining the rest position R. In this case, the rotation of the pivotal element 60 about the pivotal axis 22 comes to an end, and there then only remains a linear displacement of the pivotal element 60, namely, away from the bearing flange 36 towards the bearing flange 34 so that the probe nose 304 enters into the transverse section 318.

Thus, from the preceding description, it ensues that the detection groove 306 is constructed in such a manner that the probe nose 304 will not collide in any of the sections insofar as the pivotal element 60 and thus too, the ball neck 10, execute their predefined pivotal movements about the pivotal axis 22 and the linear movements along the pivotal axis 22.

That is to say, that the control system 300 interrogates the signal from the probe 302 in the form of a type of "emergency signal", because an actuation of the probe nose 304, by means of the groove walls 310 and 312 for example, will only occur when the movement of the pivotal element 60 deviates from the predefined form of movement.

If, for example, the pivotal movement of the ball neck 10 and hence too, the pivotal movement of the pivotal element 60, is interrupted so that the latching coupling 126 is released for example, then this will of course lead to the rotational movement of the pivotal element 60 being interrupted, but the linear displacement thereof along the pivotal axis 22 will not. If the interruption of the pivotal movement is prolonged, then the probe nose 304 will remain in the central section 308 and, in the course of an increasing linear displacement towards the bearing cheek 34, there will eventually be a collision between the groove wall 310 and the probe nose 304 and consequently, an actuation of the probe 302.

If the interruption is only temporary, the probe nose 304 nevertheless does not reach the transverse section 318 without colliding with the groove wall 310 during the course of its movement along the central section 308, since, due to the interruption of the pivotal movement of the pivotal element 60, the linear displacement along the pivotal axis 22 would continue to occur without pivotal movement, so that the probe nose 304 approaches the groove wall 310 more closely than in the case of a normal pivotal movement, and consequently, it collides with the groove wall 310 before reaching the transverse section 318.

In inverse manner, the probe nose 304 also monitors the movement from the rest position R into the operative position A whereby, in this case, collisions with the groove wall 312 occur upon interruption of the pivotal movement.

In order to be able to further ensure that the pivotal element 60 together with the interlocking elements 70 is actually in engagement with the interlocking elements 89 in the operative position A, a further probe 330 is also associated with the control system 300, this probe being arranged, for example, on the bearing cheek 36 and interrogating the position of the pivotal element 60 or the position of the interlocking element 70 or even the position of the stop cam 142 for example, when these are in the operative position A.

Thus, the control system 300 is in the position of being able to determine the proper locked state of the pivotal element 60 in the operative position by means of a positive signal.

Moreover, in order to enable the electric motor for the drive 58 to be switched off at the right moment, the control system 300 is preferably provided with a current monitoring circuit 332 which monitors the current for the electric motor of the drive 58 and thus detects when the drive 58 has been blocked as a result of the interlocking elements 70 and 80 being restrained within one another due to the fact that the operative position A has been reached, and consequently, the current has increased. If a blockage of the drive 58 of this type occurs, as denoted by the signal from the probe 330 which detects the fact that the interlocking elements 70 and 80 are in proper engagement, then the control system 300 knows that the motor 58 can be switched off.

If however, a blockage of the drive 58 of this type occurs without the probe 330 having emitted the signal indicative of the arrival in the operative position A, or the probe 302 emits a signal and thus announces a disturbance in the course of the pivotal movement, then the control system 300 reverses the direction of rotation and attempts to reach the previous end position, namely, the previous operative position A or the rest position R.

If a signal from the probe 302, or a blockage of the drive 58 reoccurs during this attempt to reverse the direction of movement, another reversal of direction will be effected by the control system 300 and then, if a signal is emitted by the probe 302 or the drive 58 is blocked yet again following the third reversal of direction, the system is stopped and an alarm in regard to the disturbance is given.

What is claimed is:

1. A trailer coupling for motor vehicles comprising:
   a pivot bearing body for rigid attachment to a vehicle and upon which there is mounted a pivotal element that is pivotal about a pivotal axis,
   a ball neck extending outwardly from the pivotal element and carrying a coupling ball at an end thereof remote from the pivotal element, said ball neck being moveable between an operative position and a rest position by pivoting motion about said pivotal axis, and
   a locking device for fixing the pivotal element relative to the pivot bearing body in an interlocking manner,
   said pivotal element being mounted on the pivot bearing body such that said pivotal element is displaceable along the pivotal axis thereof,
   said pivotal element being movable, by displacement along the pivotal axis, into a pivotable position wherein said locking device is inoperable and said pivotal element is pivotable relative to the pivot bearing body and into a non-pivotable position wherein said locking device is operable and said pivotal element is fixed relative to the pivot bearing body in a mutually non-rotatable manner.

2. A trailer coupling in accordance with claim 1, wherein the pivotal element is non-rotatably connected to at least one first interlocking element.

3. A trailer coupling in accordance with claim 2, wherein the at least one first interlocking element is connected stationary relative to the pivotal element.

4. A trailer coupling in accordance with claim 2, wherein the pivot bearing body is connected to at least one second interlocking element which is arranged substantially non-rotatable relative to the pivotal axis.

5. A trailer coupling in accordance with claim 4, wherein the at least one second interlocking element is fixed immovably relative to the pivot bearing body.

6. A trailer coupling in accordance with claim 2, wherein the first interlocking element and the second interlocking element are adapted to be moved into engagement with the respective other interlocking element.

7. A trailer coupling in accordance with claim 2, wherein at least one interlocking element comprises interlocking surfaces which taper in a direction of engagement, said surfaces serving to fix the pivotal element relative to the pivot bearing body in said mutually non-rotatable manner.

8. A trailer coupling in accordance with claim 7, wherein the interlocking surfaces which taper in the direction of engagement extend conically towards one another.

9. A trailer coupling in accordance with claim 7, wherein interlocking elements comprise interlocking surfaces which extend in parallel with the direction of engagement.

10. A trailer coupling in accordance with claim 9, wherein the interlocking surfaces which extend in parallel with the direction of engagement adjoin the interlocking surfaces which taper in the direction of engagement.

11. A trailer coupling in accordance with claim 1, wherein the pivotal element is fixable relative to the pivot bearing body in two mutually opposite directions of rotation about the pivotal axis by means of interlocking elements.

12. A trailer coupling in accordance with claim 2, wherein in the operative position of the ball neck, the pivotal element is fixed relative to the pivot bearing body in said non-rotatable position.

13. A trailer coupling in accordance with claim 4, wherein interlocking elements are restrainable in said non-rotatable position by means of a wedge mechanism.

14. A trailer coupling in accordance with claim 13, wherein the interlocking elements are arranged between the pivotal element and a bearing element of the pivot bearing body, and the wedge mechanism is effective on the pivotal element and on the bearing element.

15. A trailer coupling in accordance with claim 14, wherein the wedge mechanism is in direct engagement with the bearing element.

16. A trailer coupling in accordance with claim 13, wherein the wedge mechanism is formed by two interengaging threads.

17. A trailer coupling in accordance with claim 1, wherein a wedge mechanism is provided for producing the movement of the pivotal element along the pivotal axis relative to the pivot bearing body.

18. A trailer coupling in accordance with claim 17, wherein the same wedge mechanism serves for the displacement of the pivotal element relative to the pivot bearing body and for restraining the interlocking elements.

19. A trailer coupling in accordance with claim 1, wherein the pivotal element is movable along the pivotal axis between individual positions by means of a motorized drive.

20. A trailer coupling in accordance with claim 19, wherein a wedge mechanism driven by the motorized drive is provided for producing the movement of the pivotal element along the pivotal axis relative to the pivot bearing body.

21. A trailer coupling in accordance with claim 1, wherein in the pivotable position relative to the pivot bearing body, the pivotal element is pivotable between the operative position and the rest position by means of a motorized drive.

22. A trailer coupling in accordance with claim 20, wherein the motorized drive is provided exclusively for the pivotal movement of the pivotal element.

23. A trailer coupling in accordance with claim 21, wherein a pivoting drive for the pivotal element is derived from the motorized drive and provides for the displacement of the pivotal element along the pivotal axis between individual positions.

24. A trailer coupling in accordance with claim 23, wherein the pivoting drive is coupled to the motorized drive via a torque transmitting coupling for moving the pivotal element along the pivotal axis.

25. A trailer coupling in accordance with claim 1, wherein the pivotal element is mounted on the pivot bearing body by means of a bearing pin.

26. A trailer coupling in accordance with claim 25, wherein the pivotal element is rotatable relative to the bearing pin.

27. A trailer coupling in accordance with claim 25, wherein a displacement of the pivotal element between individual positions is attained by means of a displacement of the bearing pin along the pivotal axis.

28. A trailer coupling in accordance with claim 27, wherein interlocking elements are adapted to be restrained together by displacement of the bearing pin for fixing the pivotal element in a non-rotatable manner.

29. A trailer coupling in accordance with claim 25, wherein the bearing pin is rotatably mounted in the pivot bearing body to effect a pivotal movement of the pivotal element relative to the pivot bearing body.

30. A trailer coupling in accordance with claim 29, wherein a torque producing coupling is provided between the rotatably driven bearing pin and the pivotal element.

31. A trailer coupling in accordance with claim 1, wherein the pivotal element is movable along the pivotal axis between the pivotable position and a holding position in which the pivotal element is fixed on the pivot bearing body in a mutually non-rotatable manner.

32. A trailer coupling in accordance with claim 31, wherein the pivotal element is in said holding position both in the rest position and the operative position of the ball neck.

33. A trailer coupling in accordance with claim 31, wherein the pivotal element is in a first position in a rest position, and is movable from said first position into the pivotable position and from the pivotable position into the holding position in which the ball neck is in the operative position.

34. A trailer coupling in accordance with claim 33, wherein said first position is also a holding position in which the pivotal element is fixed relative to the pivot bearing body in said mutually non-rotatable manner.

35. A trailer coupling in accordance with claim 34, wherein the pivotal element is fixed relative to the pivot bearing body in said first position by an interlocking arrangement.

36. A trailer coupling in accordance with claim 1 comprising a control system,
wherein movements of the pivotal element from an operative position into a rest position and vice versa are adapted to be monitored by said control system by means of at least one sensor.

37. A trailer coupling in accordance with claim 36, wherein the control system interrupts the pivotal movement of the pivotal element in the event a deviation of the movement of the pivotal element from a predefined form of movement is detected.

38. A trailer coupling in accordance with claim 36, wherein individual positions of the pivotal element are detectable by means of the sensor.

39. A trailer coupling in accordance with claim 38, wherein movement of the pivotal element is detectable by means of the sensor scanning a slider track.

40. A trailer coupling in accordance with claim 36, wherein the control system comprises a current monitor for a motorized drive, and interrupts the drive in the event that a predetermined current level is exceeded.

* * * * *